(12) United States Patent
Montojo et al.

(10) Patent No.: US 11,791,878 B2
(45) Date of Patent: Oct. 17, 2023

(54) TRANSMISSION STRATEGY SIGNALING

(71) Applicants: Juan Montojo, San Diego, CA (US); Alexei Yurievitch Gorokhov, San Diego, CA (US); Peter Gaal, San Diego, CA (US); Yu Zhang, Beijing (CN); Joseph Binamira Soriaga, San Diego, CA (US); Tingfang Ji, San Diego, CA (US); Hari Sankar, San Diego, CA (US); Alexandros Manolakos, San Diego, CA (US); Qualcomm Incorporated, San Diego, CA (US)

(72) Inventors: Juan Montojo, San Diego, CA (US); Alexei Yurievitch Gorokhov, San Diego, CA (US); Peter Gaal, San Diego, CA (US); Yu Zhang, Beijing (CN); Joseph Binamira Soriaga, San Diego, CA (US); Tingfang Ji, San Diego, CA (US); Hari Sankar, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 16/625,591

(22) PCT Filed: Jun. 20, 2018

(86) PCT No.: PCT/CN2018/092004
§ 371 (c)(1),
(2) Date: Dec. 20, 2019

(87) PCT Pub. No.: WO2018/233634
PCT Pub. Date: Dec. 27, 2018

(65) Prior Publication Data
US 2021/0359741 A1   Nov. 18, 2021

(30) Foreign Application Priority Data

Jun. 20, 2018   (WO) ............... PCT/CN2018/092004

(51) Int. Cl.
*H04B 7/0413*   (2017.01)
*H04B 7/06*   (2006.01)

(52) U.S. Cl.
CPC ......... *H04B 7/0626* (2013.01); *H04B 7/0413* (2013.01); *H04B 7/0632* (2013.01); *H04B 7/0639* (2013.01)

(58) Field of Classification Search
CPC ...... H04B 7/06; H04B 7/0413; H04B 7/0626; H04B 7/0632; H04B 7/0639;
(Continued)

(56) References Cited

U.S. PATENT DOCUMENTS

2009/0086648 A1   4/2009   Xu et al.
2011/0206024 A1   8/2011   Lee et al.
(Continued)

FOREIGN PATENT DOCUMENTS

CN   1691536 A   11/2005
CN   101505205 A   8/2009
(Continued)

OTHER PUBLICATIONS

Nortel: "On DCI Format for Open-Loop MIMO", 3GPP TSG-RAN Working Group 1 Meeting #53bis, R1-082509, Warsaw, Poland, Jun. 30-Jul. 4, 2008, pp. 1-3.
(Continued)

*Primary Examiner* — Shawkat M Ali
(74) *Attorney, Agent, or Firm* — Holland & Hart LLP

(57) ABSTRACT

Techniques are discussed herein identify transmission strategies and to communicate those identified transmission strategies in a transparent communication environment. In
(Continued)

some examples, a user equipment (UE) may identify a new transmission strategy for a downlink channel different from a current transmission strategy for the down link channel. The UE may transmit a channel state information (CSI) message that includes an indication of the new transmission strategy identified by the UE. In some examples, a base station may identify the new transmission strategy for the downlink channel. The base station may transmit a codebook subset restriction (CSR) indicator that includes an indication of the new transmission strategy identified by the base station. In some examples, the UE may modify its feedback strategy based on the new transmission strategy.

27 Claims, 17 Drawing Sheets

(58) Field of Classification Search
CPC ........... H04B 17/336; H04L 1/00; H04L 1/02; H04L 5/00; H04L 12/26; H04W 28/02; H04W 52/20; H04W 72/04; H04W 74/00; H04W 84/02
USPC ........ 370/252, 330, 338; 375/219, 260, 267, 375/295, 316
See application file for complete search history.

(56) References Cited

U.S. PATENT DOCUMENTS

| | | | |
|---|---|---|---|
| 2012/0093016 A1 | 4/2012 | Zhang et al. | |
| 2013/0279460 A1* | 10/2013 | Kim | H04W 24/02 370/329 |
| 2015/0117350 A1* | 4/2015 | Seo | H04B 7/0417 370/329 |
| 2017/0366325 A1* | 12/2017 | Kwak | H04B 7/0626 |
| 2018/0069611 A1* | 3/2018 | Kim | H04W 72/0446 |
| 2019/0253876 A1* | 8/2019 | Sun | H04W 72/042 |

FOREIGN PATENT DOCUMENTS

| | | |
|---|---|---|
| CN | 101507167 A | 8/2009 |
| CN | 101816203 A | 8/2010 |
| CN | 101873159 A | 10/2010 |
| CN | 102055567 A | 5/2011 |
| CN | 102170336 A | 8/2011 |
| CN | 102792606 A | 11/2012 |
| CN | 102932110 A | 2/2013 |
| CN | 104885393 A | 9/2015 |
| CN | 105634572 A | 6/2016 |
| CN | 107683576 A | 2/2018 |
| WO | WO-2011115532 A1 | 9/2011 |
| WO | WO-2012046988 A2 | 4/2012 |
| WO | WO-2016162803 A1 | 10/2016 |

OTHER PUBLICATIONS

Supplementary European Search Report—EP18820132—Search Authority—Munich—dated Jun. 1, 2021 (174818EP).
International Search Report and Written Opinion—PCT/CN2017/089763—ISA/EPO—dated Feb. 24, 2018 (174818WO1).
International Search Report and Written Opinion—PCT/CN2018/092004—ISA/EPO—dated Sep. 10, 2018 (174818WO2).
Supplementary Partial European Search Report—EP18820132—Search Authority—Munich—dated Feb. 22, 2021 (174818EP).
Ball, F.C., et al., "Performance Analysis of Closed and Open Loop MIMO in LTE", 2009 European Wireless Conference, 2009, pp. 260-265.
Mestre, X., et al., "Effect of Fading Correlation on the Asymptotic Open-Loop and Closed-Loop Capacity of MIMO System", Proceedings 2003 IEEE Information Theory Workshop (Cat. No.03EX674), Mar. 31-Apr. 4, 2003, pp. 349-352.
Tianyun S., "Research on Key Technologies of Multiple Antennas in LTE-A System", Apr. 1, 2014, China Master's Theses Full-text Database Information Science and Technology, 123 Pages.

* cited by examiner ual communication environment. Accordingly, techniques for communicating selections of new transmission strategies may be used. Such techniques may include positioning indications of transmission strategies in feedback messages, in precoding matrix indicator fields of feedback messages, or in codebook subset restriction fields of layer three messages.

TRANSMISSION STRATEGY SIGNALING

CROSS REFERENCES

This application is a 371 national phase filing of International Application No. PCT/CN2018/092004 by Montojo et al., entitled "TRANSMISSION STRATEGY SIGNALING", filed Jun. 20, 2018, which claims priority to Chinese PCT International Patent Application No. PCT/CN2017/089763 by Montojo et al., entitled "TRANSMISSION STRATEGY SIGNALING", filed Jun. 23, 2017, each of which is assigned to the assignee hereof.

BACKGROUND

The following relates generally to wireless communication, and more specifically to transmission strategy signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communication systems may support using different transmission and/or feedback mechanisms to manage communication link performance. For example, some wireless communication systems may be capable of communicating using different transmission modes, which may be different for downlink transmissions and uplink transmissions. Some of these transmissions modes may include the use of multiple input multiple output (MIMO) transmissions, including multi-user MIMO (MU-MIMO) and single-user MIMO (SU-MIMO). Some of the transmission modes may also use spatial multiplexing techniques, with multiple layers multiplexed to multiple antennas of a wireless device. These spatial multiplexing techniques include open-loop and closed-loop techniques, where feedback information regarding a channel may be provided from a receiving wireless device (e.g., a UE for downlink) to a transmitting wireless device (e.g., a base station or access network node for downlink) to improve communication link performance.

SUMMARY

The described techniques relate to improved methods, systems, devices, or apparatuses that support transmission strategy signaling. Generally, the described techniques provide for identifying transmission strategies and communicating those identified transmission strategies. In a transparent communication environment, the wireless communication system may not establish different communication modes using layer three signaling. As such, information may be communicated using a communication link in the absence of special configurations for the wireless devices of the communication link. There are still advantages, however, to using different communication strategies even in a transparent communication environment. Accordingly, techniques for communicating selections of new transmission strategies may be used. Such techniques may include positioning indications of transmission strategies in feedback messages, in precoding matrix indicator fields of feedback messages, or in codebook subset restriction fields of layer three messages.

In some cases, a UE may be configured to select a transmission strategy and communicate an indication of the selected transmission strategy to the base station. In some examples, a UE may identify a new transmission strategy for a downlink channel different from a current transmission strategy for the down link channel. The UE may transmit a channel state information message to the base station that includes an indication of the new transmission strategy identified. In some examples, a base station may identify the new transmission strategy for the downlink channel.

In some examples, a base station may transmit a codebook subset restriction indicator that includes an indication of a new transmission strategy for a downlink channel, as well as a feedback strategy for the UE to use to provide feedback information regarding the communication link (e.g., the downlink channel) to the base station. In some examples, the UE may modify its feedback strategy based on the new transmission strategy.

A method of wireless communication is described. The method may include identifying, by the UE, a transition from a first transmission strategy for a downlink channel to a second transmission strategy for the downlink channel, determining feedback information based at least in part on the identified second transmission strategy for the downlink channel, and transmitting, to a base station, a channel state information (CSI) message that includes the feedback information and an indication of the transition from the first transmission strategy to the second transmission strategy.

An apparatus for wireless communication is described. The apparatus may include means for identifying, by the UE, a transition from a first transmission strategy for a downlink channel to a second transmission strategy for the downlink channel, means for determining feedback information based at least in part on the identified second transmission strategy for the downlink channel, and means for transmitting, to a base station, a CSI message that includes the feedback information and an indication of the transition from the first transmission strategy to the second transmission strategy.

Another apparatus for wireless communication is described. The apparatus may include a processor, memory in electronic communication with the processor, and instructions stored in the memory. The instructions may be operable to cause the processor to identify, by the UE, a transition from a first transmission strategy for a downlink channel to a second transmission strategy for the downlink channel, determine feedback information based at least in part on the identified second transmission strategy for the downlink channel, and transmit, to a base station, a CSI message that includes the feedback information and an indication of the transition from the first transmission strategy to the second transmission strategy.

A non-transitory computer readable medium for wireless communication is described. The non-transitory computer-readable medium may include instructions operable to cause a processor to identify, by the UE, a transition from a first transmission strategy for a downlink channel to a second transmission strategy for the downlink channel, determine feedback information based at least in part on the identified second transmission strategy for the downlink channel, and transmit, to a base station, a CSI message that includes the feedback information and an indication of the transition from the first transmission strategy to the second transmission strategy.

In some examples of the method, apparatus, and non-transitory computer-readable medium described above, the first transmission strategy may be a closed-loop MIMO transmission strategy and the second transmission strategy may be an open-loop MIMO transmission strategy or a semi-open-loop MIMO transmission strategy. In some examples of the method, apparatus, and non-transitory computer-readable medium described above, the first transmission strategy may be the open-loop MIMO transmission strategy, or the semi-open-loop MIMO transmission strategy and the second transmission strategy may be the closed-loop MIMO transmission strategy. In some examples of the method, apparatus, and non-transitory computer-readable medium described above, the first transmission strategy is the open-loop MIMO transmission strategy and the second transmission strategy is the semi-open-loop transmission strategy. In some examples of the method, apparatus, and non-transitory computer-readable medium described above, the first transmission strategy is the semi-open-loop MIMO transmission strategy and the second transmission strategy is the open-loop transmission strategy.

In some examples of the method, apparatus, and non-transitory computer-readable medium described above, the first transmission strategy, or the second transmission strategy, or a combination thereof comprise a transmission mode.

Some examples of the method, apparatus, and non-transitory computer-readable medium described above may further include processes, features, means, or instructions for transmitting the indication using layer two signaling or layer one signaling, the indication identifying the second transmission strategy for the downlink channel.

Some examples of the method, apparatus, and non-transitory computer-readable medium described above may further include processes, features, means, or instructions for transmitting the indication in a precoding matrix indicator (PMI) field of the CSI message, the indication identifying the second transmission strategy for the downlink channel.

Some examples of the method, apparatus, and non-transitory computer-readable medium described above may further include processes, features, means, or instructions for identifying a preconfigured or predefined PMI entry based at least in part on identifying the transition to the second transmission strategy, wherein the indication may be the preconfigured or predefined PMI entry.

Some examples of the method, apparatus, and non-transitory computer-readable medium described above may further include processes, features, means, or instructions for determining a channel quality indicator (CQI) of the CSI message based at least in part on identifying the transition to the second transmission strategy being in the PMI field of the CSI message, wherein the CSI message includes the determined CQI.

In some examples of the method, apparatus, and non-transitory computer-readable medium described above, a first preconfigured entry of the PMI field indicates that the second transmission strategy may be based at least in part on resource block group (RBG) based precoder-cycling or on precoding resource block group (PRG) based precoder-cycling. In some examples of the method, apparatus, and non-transitory computer-readable medium described above, a second preconfigured entry of the PMI field indicates that the second transmission strategy may be based at least in part on small delay cyclic delay diversity (CDD).

Some examples of the method, apparatus, and non-transitory computer-readable medium described above may further include processes, features, means, or instructions for identifying a data transfer rate of the first transmission strategy for the downlink channel, wherein the indication of the transition to the second transmission strategy for the downlink channel may be based at least in part on the data transfer rate.

In some examples of the method, apparatus, and non-transitory computer-readable medium described above, the indication includes a request for the base station to modify its transmission protocol for the downlink channel to the second transmission strategy.

A method of wireless communication is described. The method may include transmitting first data using a first transmission strategy on a downlink channel, receiving, from a UE, a CSI message that includes feedback information and an indication of a transition from the first transmission strategy to a second transmission strategy for the downlink channel, and transmitting second data using the second transmission strategy on the downlink channel based at least in part on receiving the indication.

An apparatus for wireless communication is described. The apparatus may include means for transmitting first data using a first transmission strategy on a downlink channel, means for receiving, from a UE, a CSI message that includes feedback information and an indication of a transition from the first transmission strategy to a second transmission strategy for the downlink channel, and means for transmitting second data using the second transmission strategy on the downlink channel based at least in part on receiving the indication.

Another apparatus for wireless communication is described. The apparatus may include a processor, memory in electronic communication with the processor, and instructions stored in the memory. The instructions may be operable to cause the processor to transmit first data using a first transmission strategy on a downlink channel, receive, from a UE, a CSI message that includes feedback information and an indication of a transition from the first transmission strategy to a second transmission strategy for the downlink channel, and transmit second data using the second transmission strategy on the downlink channel based at least in part on receiving the indication.

A non-transitory computer readable medium for wireless communication is described. The non-transitory computer-readable medium may include instructions operable to cause a processor to transmit first data using a first transmission strategy on a downlink channel, receive, from a UE, a CSI message that includes feedback information and an indication of a transition from the first transmission strategy to a second transmission strategy for the downlink channel, and transmit second data using the second transmission strategy on the downlink channel based at least in part on receiving the indication.

In some examples of the method, apparatus, and non-transitory computer-readable medium described above, the first transmission strategy may be a closed-loop MIMO transmission strategy and the second transmission strategy may be an open-loop MIMO transmission strategy or a semi-open-loop MIMO transmission strategy. In some examples of the method, apparatus, and non-transitory computer-readable medium described above, the first transmission strategy may be the open-loop MIMO transmission strategy, or the semi-open-loop MIMO transmission strategy and the second transmission strategy may be the closed-loop MIMO transmission strategy. In some examples of the method, apparatus, and non-transitory computer-readable medium described above, the first transmission strategy is the open-loop MIMO transmission strategy and the second transmission strategy is the semi-open-loop transmission strategy. In some examples of the method, apparatus, and non-transitory computer-readable medium described above, the first transmission strategy is the semi-open-loop MIMO transmission strategy and the second transmission strategy is the open-loop transmission strategy.

In some examples of the method, apparatus, and non-transitory computer-readable medium described above, the first transmission strategy, or the second transmission strategy, or a combination thereof comprise a transmission mode.

Some examples of the method, apparatus, and non-transitory computer-readable medium described above may further include processes, features, means, or instructions for modifying a transmission protocol of the base station based at least in part on receiving the indication of the second transmission strategy, wherein transmitting the second data may be based at least in part on the modified transmission protocol.

In some examples of the method, apparatus, and non-transitory computer-readable medium described above, the indication may be received using layer two signaling or layer one signaling.

In some examples of the method, apparatus, and non-transitory computer-readable medium described above, a PMI field of the CSI message includes the indication.

In some examples of the method, apparatus, and non-transitory computer-readable medium described above, the indication includes a request for the base station to modify its transmission protocol for the downlink channel to the second transmission strategy.

A method of wireless communication is described. The method may include receiving first data using a first transmission strategy on a downlink channel, receiving, from a base station, a codebook subset restriction (CSR) indicator that identifies a second transmission strategy for the downlink channel and a feedback strategy for the UE, determining feedback information based at least in part on the identified second transmission strategy for the downlink channel and the identified feedback strategy, and transmitting, to the base station, a CSI message that includes the feedback information.

An apparatus for wireless communication is described. The apparatus may include means for receiving first data using a first transmission strategy on a downlink channel, means for receiving, from a base station, a CSR indicator that identifies a second transmission strategy for the downlink channel and a feedback strategy for the UE, means for determining feedback information based at least in part on the identified second transmission strategy for the downlink channel and the identified feedback strategy, and means for transmitting, to the base station, a CSI message that includes the feedback information.

Another apparatus for wireless communication is described. The apparatus may include a processor, memory in electronic communication with the processor, and instructions stored in the memory. The instructions may be operable to cause the processor to receive first data using a first transmission strategy on a downlink channel, receive, from a base station, a CSR indicator that identifies a second transmission strategy for the downlink channel and a feedback strategy for the UE, determine feedback information based at least in part on the identified second transmission strategy for the downlink channel and the identified feedback strategy, and transmit, to the base station, a CSI message that includes the feedback information.

A non-transitory computer readable medium for wireless communication is described. The non-transitory computer-readable medium may include instructions operable to cause a processor to receive first data using a first transmission strategy on a downlink channel, receive, from a base station, a CSR indicator that identifies a second transmission strategy for the downlink channel and a feedback strategy for the UE, determine feedback information based at least in part on the identified second transmission strategy for the downlink channel and the identified feedback strategy, and transmit, to the base station, a CSI message that includes the feedback information.

In some examples of the method, apparatus, and non-transitory computer-readable medium described above, the first transmission strategy may be a closed-loop MIMO transmission strategy and the second transmission strategy may be an open-loop MIMO transmission strategy or a semi-open-loop MIMO transmission strategy. In some examples of the method, apparatus, and non-transitory computer-readable medium described above, the first transmission strategy may be the open-loop MIMO transmission strategy, or the semi-open-loop MIMO transmission strategy and the second transmission strategy may be the closed-loop MIMO transmission strategy. In some examples of the method, apparatus, and non-transitory computer-readable medium described above, the first transmission strategy is the open-loop MIMO transmission strategy and the second transmission strategy is the semi-open-loop transmission strategy. In some examples of the method, apparatus, and non-transitory computer-readable medium described above, the first transmission strategy is the semi-open-loop MIMO transmission strategy and the second transmission strategy is the open-loop transmission strategy.

In some examples of the method, apparatus, and non-transitory computer-readable medium described above, the first transmission strategy, or the second transmission strategy, or a combination thereof comprise a transmission mode.

Some examples of the method, apparatus, and non-transitory computer-readable medium described above may further include processes, features, means, or instructions for identifying a preconfigured CSR index for the identified second transmission strategy and the identified feedback strategy based at least in part on the CSR indicator.

Some examples of the method, apparatus, and non-transitory computer-readable medium described above may further include processes, features, means, or instructions for receiving second data using the second transmission strategy on the downlink channel, wherein the second data of the second transmission strategy may be transmitted using a same layer three transmission mode as the first data of the first transmission strategy.

A method of wireless communication is described. The method may include transmitting, to a UE, first data using a first transmission strategy on a downlink channel, identifying a second transmission strategy for the downlink channel and a feedback strategy for the UE, transmitting a CSR indicator that identifies the second transmission strategy and the feedback strategy, and receiving a CSI message based at least in part on the feedback strategy identified by the CSR indicator.

An apparatus for wireless communication is described. The apparatus may include means for transmitting, to a UE, first data using a first transmission strategy on a downlink channel, means for identifying a second transmission strategy for the downlink channel and a feedback strategy for the UE, means for transmitting a CSR indicator that identifies the second transmission strategy and the feedback strategy, and means for receiving a CSI message based at least in part on the feedback strategy identified by the CSR indicator.

Another apparatus for wireless communication is described. The apparatus may include a processor, memory in electronic communication with the processor, and instructions stored in the memory. The instructions may be operable to cause the processor to transmit, to a UE, first data using a first transmission strategy on a downlink channel, identify a second transmission strategy for the downlink channel and a feedback strategy for the UE, transmit a CSR indicator that identifies the second transmission strategy and the feedback strategy, and receive a CSI message based at least in part on the feedback strategy identified by the CSR indicator.

A non-transitory computer readable medium for wireless communication is described. The non-transitory computer-readable medium may include instructions operable to cause a processor to transmit, to a UE, first data using a first transmission strategy on a downlink channel, identify a second transmission strategy for the downlink channel and a feedback strategy for the UE, transmit a CSR indicator that identifies the second transmission strategy and the feedback strategy, and receive a CSI message based at least in part on the feedback strategy identified by the CSR indicator.

In some examples of the method, apparatus, and non-transitory computer-readable medium described above, the first transmission strategy may be a closed-loop MIMO transmission strategy and the second transmission strategy may be an open-loop MIMO transmission strategy or a semi-open-loop MIMO transmission strategy. In some examples of the method, apparatus, and non-transitory computer-readable medium described above, the first transmission strategy may be the open-loop MIMO transmission strategy, or the semi-open-loop MIMO transmission strategy and the second transmission strategy may be the closed-loop MIMO transmission strategy. In some examples of the method, apparatus, and non-transitory computer-readable medium described above, the first transmission strategy is the open-loop MIMO transmission strategy and the second transmission strategy is the semi-open-loop transmission strategy. In some examples of the method, apparatus, and non-transitory computer-readable medium described above, the first transmission strategy is the semi-open-loop MIMO transmission strategy and the second transmission strategy is the open-loop transmission strategy.

In some examples of the method, apparatus, and non-transitory computer-readable medium described above, the first transmission strategy, or the second transmission strategy, or a combination thereof comprise a transmission mode.

In some examples of the method, apparatus, and non-transitory computer-readable medium described above, information in the CSI message for the second transmission strategy may be different from information in a CSI message for the first transmission strategy.

Some examples of the method, apparatus, and non-transitory computer-readable medium described above may further include processes, features, means, or instructions for identifying a preconfigured CSR index for the second transmission strategy and the feedback strategy, wherein the CSR indicator may be the preconfigured CSR index.

Some examples of the method, apparatus, and non-transitory computer-readable medium described above may further include processes, features, means, or instructions for transmitting, to the UE, second data using the second transmission strategy on the downlink channel, wherein the second data of the second transmission strategy may be transmitted using a same layer three transmission mode as the first data of the first transmission strategy.

Some examples of the method, apparatus, and non-transitory computer-readable medium described above may further include processes, features, means, or instructions for transmitting a first CSR indicator that identifies the first transmission strategy and the feedback strategy. Some examples of the method, apparatus, and non-transitory computer-readable medium described above may further include processes, features, means, or instructions for transmitting a second CSR indicator that identifies the second transmission strategy and the feedback strategy.

Some examples of the method, apparatus, and non-transitory computer-readable medium described above may further include processes, features, means, or instructions for transmitting a subset of the first CSR indicator as the second CSR indicator.

DETAILED DESCRIPTION

Figure 1:
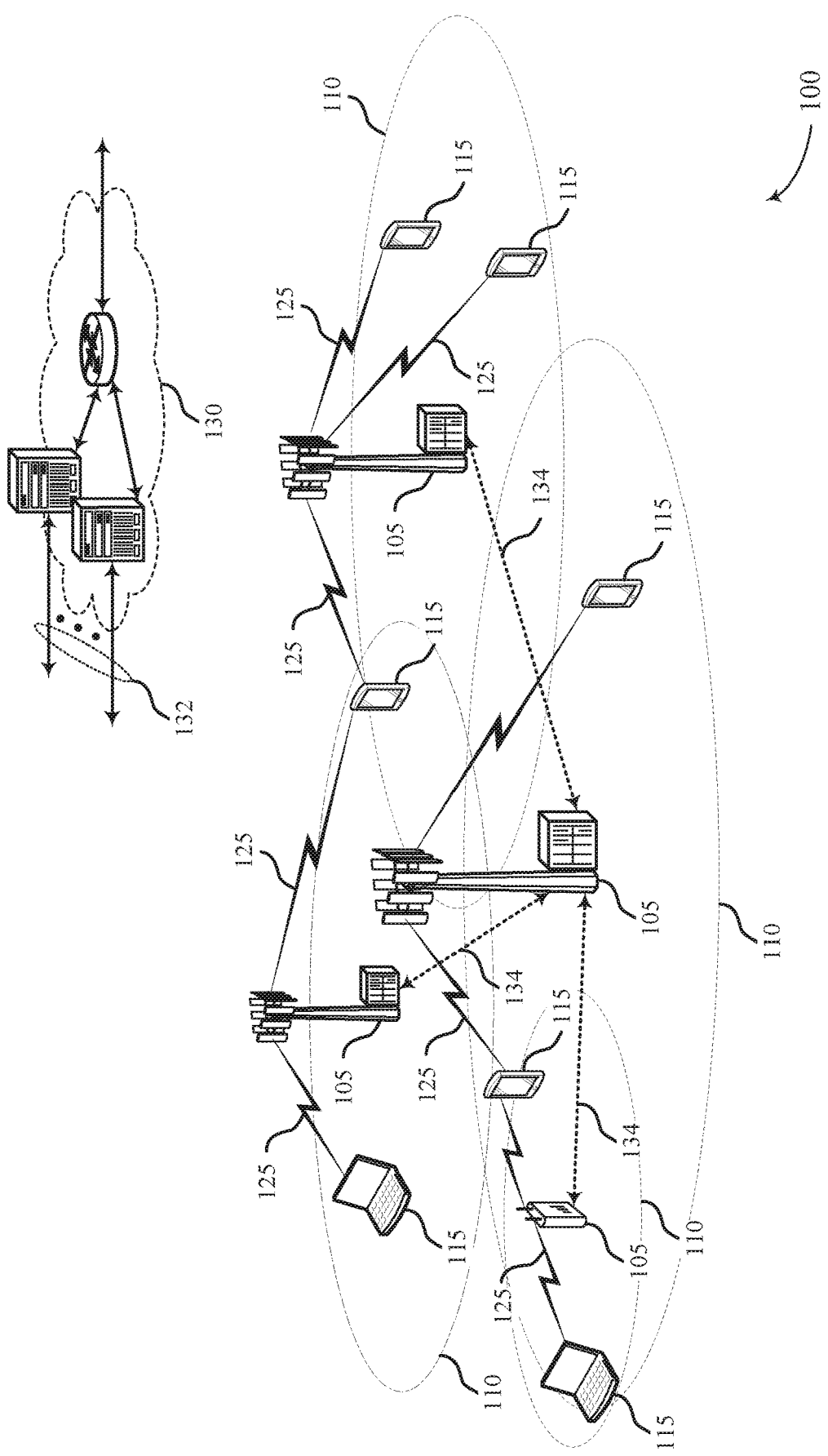
FIG. 1 illustrates an example of a system for wireless communication that supports transmission strategy signaling in accordance with aspects of the present disclosure.

Some wireless communication systems may support using different transmission strategies and/or different feedback strategies to manage communication link performance. In some cases, the use of different transmission strategies and/or different feedback strategies may be tied to different layer three transmission modes. In such cases, a base station and a UE may exchange radio resource control (RRC) messages to configure a transmission strategy. In other cases, however, the base station and the UE may be configured to communicate using only a single layer three transmission mode. Such environments may be referred to as transparent communication environments. Even though a communication link may be established with a single layer three transmission mode, it still may be advantageous to employ different transmission strategies based on channel conditions.

In some communication systems, UEs may not be permitted to select transmission strategies. As such, many communication systems do not support signaling for UE selections of transmission strategies. In some examples, it may be advantageous for a UE, rather than a network device, to select a new transmission strategy. In some wireless communication systems, a base station or other network device may be configured to select transmission strategies, but not the UE. However, in some instances, the UE may be in a better position to measure channel conditions and make a transmission strategy selection.

In some examples of a transparent communication environment, the base station and the UE may be configured to transmit in a single transmission mode. In some cases, a transparent communication environment may refer to a communication link that may only be configured using a single transmission mode. Using a single transmission mode may reduce control signaling and may simplify encoding and decoding of information at the network devices (e.g., base station and/or UE).

Techniques discussed herein relate to identifying transmission strategies and to communicating those identified transmission strategies in a transparent communication environment. These techniques may employ repurposing certain messages (e.g., feedback messages) or repurposing a certain field in a message (e.g., a precoding matrix indictor field or a codebook subset restriction field) to communicate transmission strategies. In addition, repurposing such fields may also enable a UE to make selections of transmission strategies, where other communication systems may lack such a mechanism for the UE to communicate such selections to a network device. In some examples, a UE may identify a new transmission strategy for a downlink channel that is different from a current transmission strategy for the down link channel. The UE may transmit a channel state information (CSI) message that includes an indication of the new transmission strategy identified by the UE. In some examples, a base station may identify the new transmission strategy for the downlink channel. The base station may transmit a codebook subset restriction (CSR) indicator that includes an indication of the new transmission strategy identified by the base station. In some examples, the UE may modify its feedback strategy based on the new transmission strategy.

Aspects of the disclosure are initially described in the context of a wireless communications system. Aspects of the disclosure are also described in the context of communication schemes. Aspects of the disclosure are further illustrated by and described with reference to apparatus diagrams, system diagrams, and flowcharts that relate to transmission strategy signaling.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. The wireless communications system 100 may support signaling that indicates a new transmission strategy in a transparent communication environment. In some examples, the UEs 115 may use CSI messages to indicate transmission strategies to the base stations 105. In some examples, the base stations 105 may use CSR indicators to indicate transmission strategies to the UEs 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115 or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight and may be blocked by buildings and environmental features. However, the waves may penetrate walls sufficiently to provide service to UEs 115 located indoors.

Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

MIMO wireless systems may use one or more transmission schemes between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some examples, a UE 115 may identify a new transmission strategy for a downlink channel different from a current transmission strategy for the downlink channel. UE 115 may transmit to a base station 105 a CSI message that includes an indication of the new transmission strategy identified by UE 115. In some examples, a base station 105 may identify the new transmission strategy for the downlink channel. The base station 105 may transmit a CSR indicator that includes an indication of the new transmission strategy identified by base station 105. In some examples, UE 115 may modify its feedback strategy based on the new transmission strategy. One or both of the transmissions strategies (current or new), may be a closed-loop, open-loop, or semi-open-loop (or partially-open-loop) transmission strategy, for example for MIMO transmissions.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the RRC protocol layer may provide establishment, configuration, and maintenance of an RRC connection between a UE 115 and a network device (e.g., base station 105), or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 2:
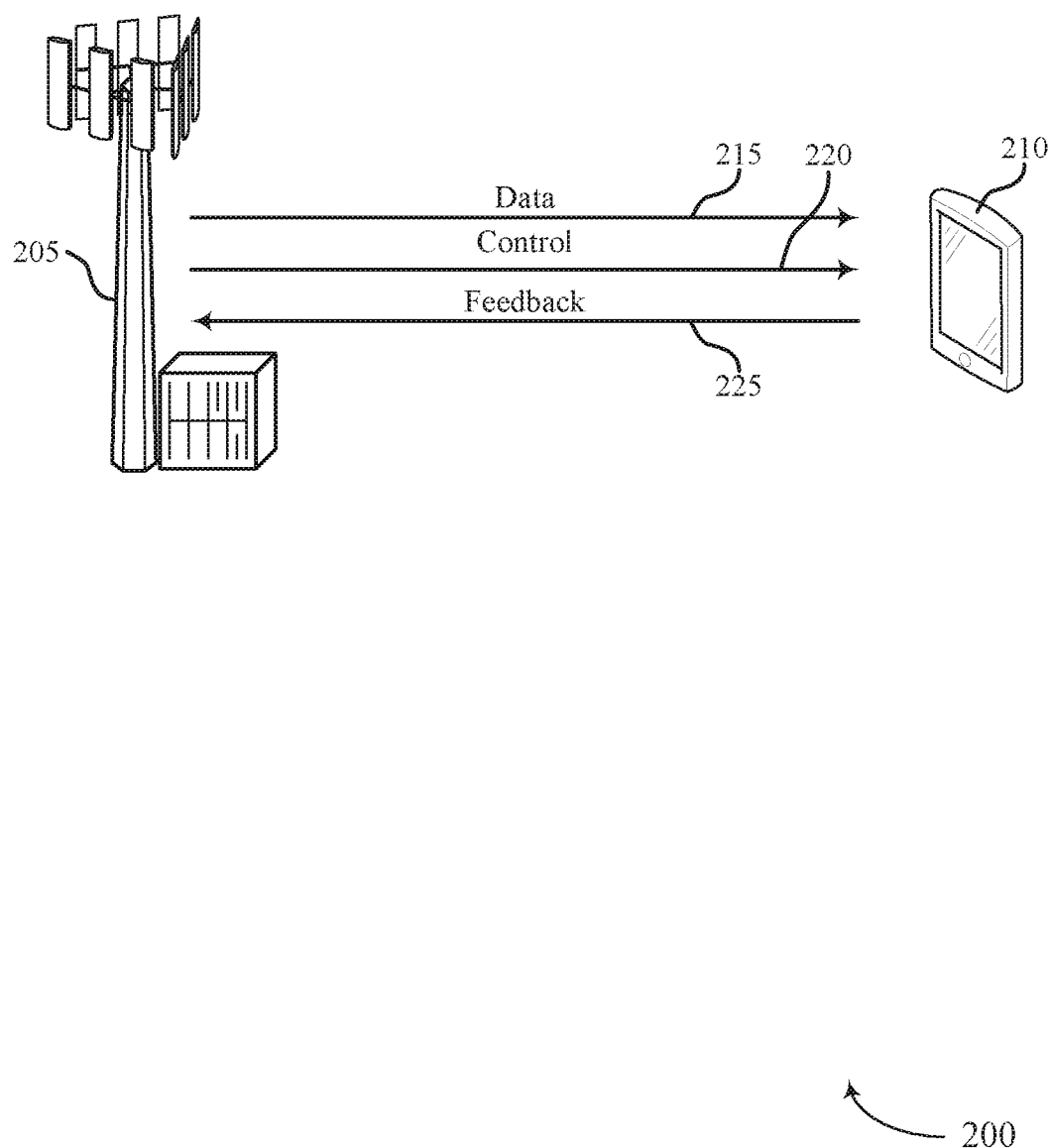
FIG. 2 illustrates an example of a wireless communication system that supports transmission strategy signaling in accordance with aspects of the present disclosure.

FIG. 2 illustrates an example of a wireless communication system 200 that supports transmission strategy signaling in accordance with various aspects of the present disclosure. In some examples, the wireless communication system 200 may implement aspects of wireless communications system 100. The wireless communication system 200 may include a base station 205 and a UE 210 configured to exchange a plurality of communications (e.g., data 215, control messages 220, and/or feedback 225) using a wireless communication link. The base station 205 may be an example of the base stations 105 described with reference to FIG. 1. The UE 210 may be an example of the UEs 115 described with reference to FIG. 1.

The wireless communication system 200 illustrates techniques for configuring different transmission strategies and different feedback strategies in a transparent communication environment. In some wireless communication systems (e.g., LTE), layer three signaling and RRC messages may be used to configure a transmission mode for communication over a wireless communication link. In some cases, a transmission mode may include multiple transmission strategies. In these wireless communication systems, the transmitter and the receiver would configure their behavior based on what transmission mode and/or feedback mode was operative. For example, in a given transmission mode, the base station 105 may configure downlink transmissions in a particular manner, and the UE 210 may configure feedback based on the configuration of the downlink transmissions. In a transparent communication environment, network devices may be configured with only a single transmission mode and/or feedback mode. In such environments, no RRC signaling may be exchanged to configure various modes. As such, network devices may continue to use the default transmission strategy and feedback strategy, even when network conditions begin to deteriorate.

Even in a transparent communication environment, various different transmission strategies and feedback strategies may be useful based on network conditions. For example, in some conditions, channel parameters may improve if a MIMO closed-loop transmission strategy is used, while in other conditions, channel parameters may improve if a MIMO open-loop transmission strategy is used. Techniques are described herein to allow network devices to configure different transmission strategies and/or different feedback strategies in a transparent communication environment.

In some cases, the UE 210 may be configured to identify a new transmission strategy and/or feedback strategy based on channel conditions. The UE 210 may use feedback 225 to indicate to the base station 205 the new transmission strategy that should be employed. In some examples, the feedback 225 may include layer one signaling or layer two signaling, such as a CSI feedback message, to indicate to the base station 205 the new transmission strategy that should be employed.

In some cases, the base station 205 may be configured to identify a new transmission strategy and/or feedback strategy based on channel conditions. The base station 205 may use a control message 220 to indicate the new transmission strategy to the UE 210. In some examples, the base station 205 may use a CSR information element (IE) of an RRC message to indicate the new transmission strategy to the UE 210.

A transmission strategy may indicate various parameters for transmitting data. In some instances, the transmission strategy may be used to configure downlink data 215 transmissions. For example, a transmission strategy may indicate different parameters for downlink MIMO transmissions. For example, a transmission strategy used by the wireless communication system 200 may include a closed-loop transmission strategy, an open-loop transmission strategy, a semi-open-loop transmission strategy, resource block group (RBG) based precoding cycling, precoding resource group (PRG) based precoding cycling, small delay cyclic delay diversity (CDD), large delay CDD, or combinations thereof. In closed-loop systems, the transmitter may use feedback from the receiver to execute dynamic adjustment based on feedback from the UE. Closed-loop systems may use channel reciprocity, which may include the same uplink and downlink channel, possible in TDD, or a feedback channel from the receiver to obtain the feedback. In some open-loop MIMO, the receiver may combine data streams from multiple transmit antennas using variety of methods to achieve diversity gain (e.g., maximum ratio combining methods). Open-loop systems may not require knowledge of the channel at the transmitter. As a result, open-loop operations may be utilized when the access network does not have information or feedback from the UE to do coding adjustment or signal (e.g., signal strength or signal quality) is not good enough. In some examples, open-loop transmission strategies may be used when the data transfer rate satisfies a threshold. For example, if the data transfer rate becomes fast enough to outpace the dynamic adjustments based on feedback from the UE 210, an open-loop transmission strategy may be used.

A feedback strategy may indicate various parameters utilized by the UE 210 to provide feedback to the base station 105. For example, in some closed-loop transmission strategies, the UE 210 may provide pre-coding matrix indicators (PMI) as feedback, while in open-loop or semi-open-loop transmission strategies, the UE 210 may not provide such feedback, or provide only certain of such feedback. In some examples, how certain feedback data is calculated (e.g., channel quality indicators (CQI), PMT, rank indicators (RI), or combinations thereof) may vary depending on the transmission strategy employed.

Figure 3:
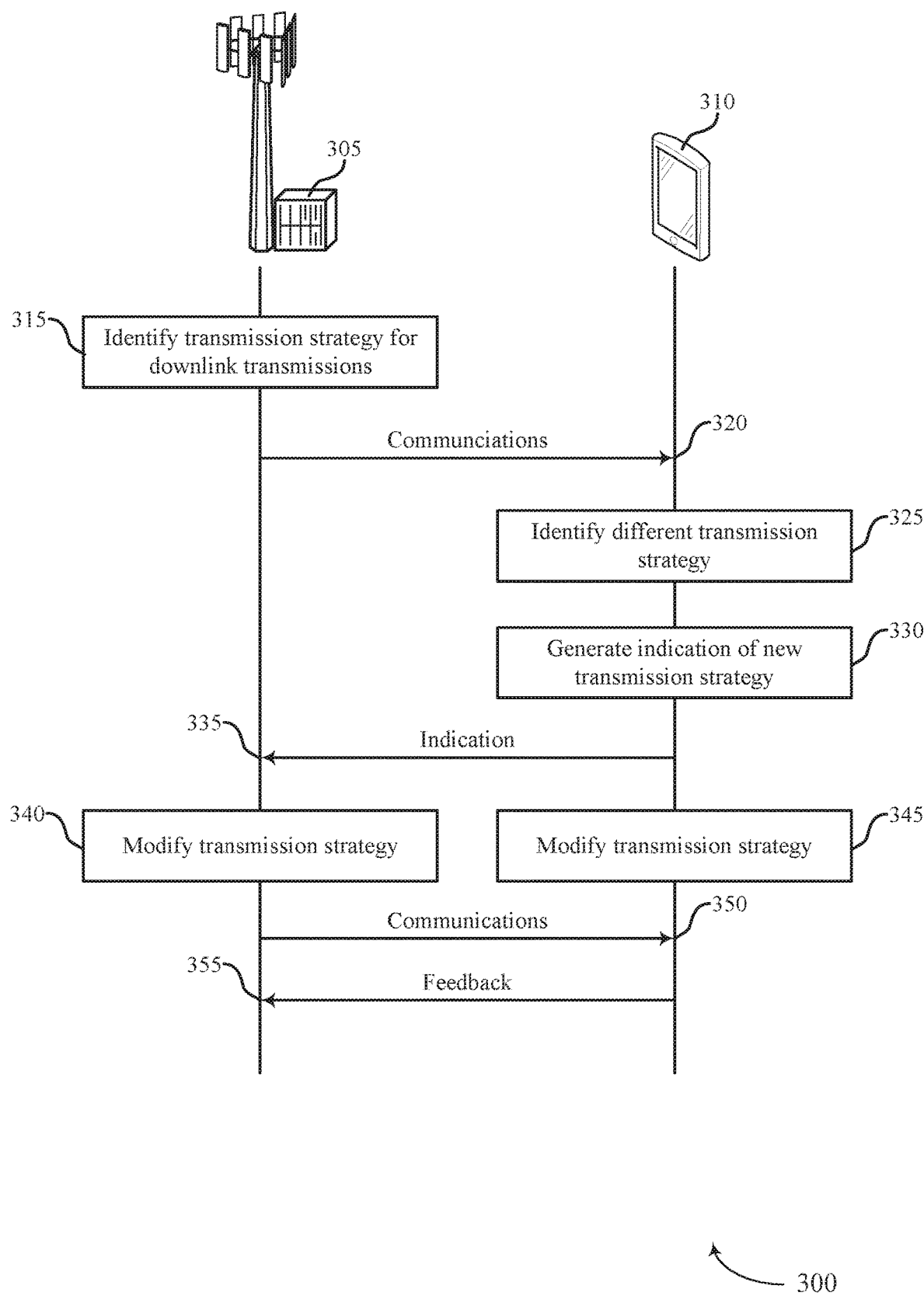
FIG. 3 illustrates an example of a communication scheme that supports transmission strategy signaling in accordance with aspects of the present disclosure.

FIG. 3 illustrates an example of a communication scheme 300 that supports transmission strategy signaling in accordance with various aspects of the present disclosure. In some examples, the communication scheme 300 may implement aspects of wireless communications system 100. The communication scheme 300 illustrates functions and communications between a base station 305 and a UE 310. In some examples, the functions of the base station 305 and UE 310 may be modified or reversed based on being in an uplink context or a downlink context. The base station 305 may be an example of base stations 105, 205 described with reference to FIGS. 1 and 2. The UE 310 may be an example of UEs 115, 210 described with reference to FIGS. 1 and 2.

The communication scheme 300 illustrates a situation where the UE 310 may be configured to identify a new transmission strategy for a downlink channel and/or feedback strategy based on channel conditions. The UE 310 may use feedback messages to indicate to the base station 305 the new transmission strategy for the downlink channel that should be employed.

At block 315, the base station 305 may identify a first transmission strategy for downlink transmissions. The first transmission strategy may be a closed-loop MIMO transmission strategy, an open-loop MIMO transmission strategy, or a semi-open-loop MIMO transmission strategy. In some examples, a closed-loop MIMO transmission strategy may be a default transmission strategy for a communication link. Each of these transmission strategies may employed in a single layer three transmission mode. The base station 305 or UE 310 may be configured to modify its transmission strategy and/or feedback strategy while remaining in a single transmission mode. In some cases, the base station 305 may identify the transmission strategy based on information determined by the base station 305. In other cases, the base station 305 may identify the transmission strategy based on information received from the UE 310. In yet other cases, the base station 305 may identify the transmission strategy based on information from both the base station 305 and the UE 310. For example, base station 305 may consider the information from the UE 310 when identifying a transmission strategy, however base station 305 may obtain further information that results in base station 305 not following the recommendation (e.g., suggestion or preference) included in the information from the UE 310.

In some examples, the base station 305 may identify a feedback strategy for receiving feedback from the UE 310. Such feedback strategies may be related to the transmission strategies. For example, the feedback needed by the base station 305 for a closed-loop MIMO transmission strategy is different from feedback needed by the base station 305 for an open-loop MIMO transmission strategy. In some examples, the base station 305 may identify the feedback strategy based on the transmission strategy. In some examples, the base station 305 may identify the feedback strategy independent of the transmission strategy. In some examples, the base station 305 may identify a transmission strategy alone, a feedback strategy alone, or a combination of the two.

After identifying the transmission strategy, the base station 305 may transmit communications 320 to the UE 310 on a downlink channel using the first transmission strategy. The communications may include user-plane data, control-plane information, or combinations thereof.

At block 325, the UE 310 may identify a second transmission strategy, different from the first transmission strategy, for the UE 310 to use to communicate with base station 305. The UE 310 may identify one or more channel conditions for the downlink channel, for example based on the communications 320. The UE 310 may identify the second transmission strategy based at least in part on the identified channel conditions. For example, the UE 310 may identify the second transmission strategy based on determining that a data transfer rate exceeds a threshold.

In other examples, the UE 310 may identify the second transmission strategy based on poor uplink channel conditions (e.g., feedback is not getting to the base station 305) or other poor network conditions. In some cases, the UE 310 may determine that an open-loop or semi-open-loop (or partially-open-loop) transmission strategy should be employed instead of a closed-loop transmission strategy on the downlink channel.

In some other cases, the UE 310 may determine that an open-loop transmission strategy should be employed instead of a semi-open-loop transmission strategy on the downlink channel. For a closed-loop transmission strategy, the UE 310 may report an entire PMI (e.g., i11, i12, and i2), which may indicate a specific precoding matrix in a predefined codebook. For semi-open-loop transmission strategies, the UE 310 may report a partial PMI (e.g., report i11 and i12, but not i2). In some semi-open-loop transmission strategies, the base station 305 may determine some information based on predefined procedures. For example, the base station 305 may determine i2 by cycling i2 from a codebook. For open-loop transmission strategies, the UE 310 may not report any PMI. In such open-loop strategies, the base station 305 may determine a precoder to use for the downlink channel without any input from the UE 310. In some examples, UE 310 may switch between using an open-loop transmission strategy and using a semi-open-loop transmission strategy.

In some examples, the UE 310 may, alternatively or additionally, identify a second feedback strategy different from the feedback strategy of the communications 320. The UE 310 may identify the feedback strategy based on the identified transmission strategy, channel conditions measured by the UE 310, or combinations thereof.

At block 330, the UE 310 may generate an indication 335 to inform the base station 305 of the second transmission strategy or the second feedback strategy or both identified by the UE 310. Upon generating the indication 335 in any of its many forms, the UE 310 may transmit the indication 335 to the base station 305 using an uplink channel.

In some instances, the UE 310 may use layer one signaling or layer two signaling or layer one signaling to transmit the indication 335. Such layer two signaling may take the form of a feedback message. In some examples, the feedback message may be an example of feedback 355. In some examples, the indication is included in a CSI message. In such examples, the PMI field of the CSI message may be configured to include the indication 335.

When using the PMI field of a CSI message to indicate an identified transmission strategy, the UE 310 may use a bitmap or an index to identify the transmission strategies. One or more unique entries in the PMI field may be reserved to indicate an open-loop transmission strategy or a semi-open-loop transmission strategy. Other entries in the PMI field may be used to indicate PMI data in other transmission strategies, such as closed-loop transmission strategies. The bitmap or index may be preconfigured and known to both the base station 305 and the UE 310.

For example, if the PMI field of a CSI message includes four bits, a bit map or index may include sixteen unique entries. Entries 1-14 may be configured to indicate PMI feedback data, entry 15 may be configured to indicate an open-loop or semi-open-loop transmission strategy that uses PRG based precoding cycling, and entry 16 may be configured to indicate an open-loop or semi-open-loop transmission strategy that uses small delay CDD. The foregoing is provided by way of example only. Other sizes of PMI fields, other sizes of bitmaps or indexes, and/or other configurations of the bitmaps or indexes are contemplated by this disclosure.

In some cases, the second transmission strategy identified or selected by the UE 310 may affect the other data included in the CSI message. For example, if the CSI message indicates that an open-loop or semi-open-loop transmission strategy is to be employed, the UE 310 may determine a different CQI entry for the CSI message than if a closed-loop transmission strategy is being used.

At block 340, the base station 305 may modify the transmission strategy for the downlink channel and/or the feedback strategy based on receiving the indication 335. The base station 305 may decode the indication 335 to identify the specific transmission strategy or the specific feedback strategy selected by the UE 310.

At block 345, the UE 310 may modify the transmission strategy and/or feedback strategy based on identifying the indication 335. The UE 310 may make these modifications either before or after transmitting the indication 335. In some examples, the base station 305 may transmit an acknowledgement (ACK) or negative acknowledgement (NACK) to UE 310 upon receiving the indication 335. After modifying the transmission strategy and/or feedback strategy, the UE 310 may determine feedback information based on the new transmission strategy or the new feedback strategy. For example, the UE 310 may modify how it calculates CQT based on which transmission strategy is being use, or the UE 310 may modify how it calculates CQI based on explicit guidance included in a feedback strategy.

After modifying the transmission strategy for the downlink channel based on the indication 335, the base station 305 may transmit communications 350 to the UE 310 along a downlink channel using the second transmission strategy. The communications may include user-plane data, control-plane information, or combinations thereof. In response to receiving the communications 350 using the second transmission strategy, the UE 310 may transmit feedback 355 to the base station 305 based on the transmission strategy and/or the feedback strategy. For example, if the communications 350 are transmitted using a first transmission strategy, the feedback 355 may include a first set of information. If the communications 350 are transmitted using a second transmission strategy different from the first transmission strategy, the feedback 355 may include a second set of information different from the first set. In some examples, the feedback 355 may be an example of a CSI message. In some examples, the feedback may be an example of a hybrid automatic repeat request (HARQ) feedback. In some examples, the transmission strategy may be transparent to the UE 310. For example, the UE 310 may not be able to identify which transmission strategy is being used based on the content of the communications 320, 350 alone. In such examples, the UE 310 may configure the feedback 355 based on a transmission strategy selected by the UE 310 or a feedback strategy received from the base station 305.

Figure 4:
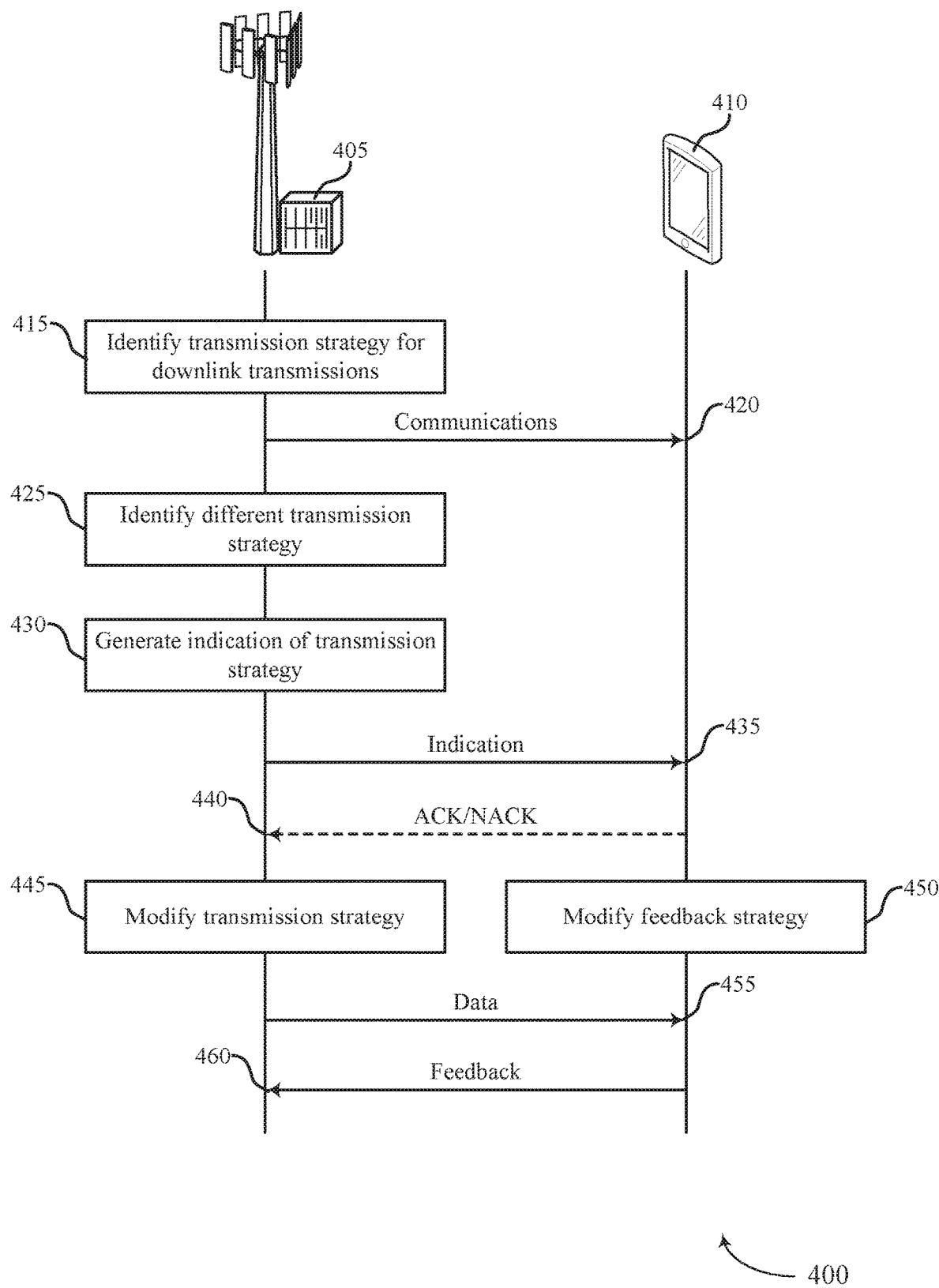
FIG. 4 illustrates an example of a communication scheme that supports transmission strategy signaling in accordance with aspects of the present disclosure.

FIG. 4 illustrates an example of a communication scheme 400 that supports transmission strategy signaling in accordance with various aspects of the present disclosure. In some examples, the communication scheme 400 may implement aspects of wireless communications system 100. The communication scheme 400 illustrates functions and communications between a base station 405 and a UE 410. In some examples, the functions of the base station 405 and UE 410 may be modified or reversed based on being in an uplink context or a downlink context. The base station 405 may be an example of base stations 105, 205, 305 described with reference to FIGS. 1-3. The UE 410 may be an example of UEs 115, 210, 310 described with reference to FIGS. 1-3.

The communication scheme 400 illustrates a situation where the base station 405 may be configured to communicate the selection of a new transmission strategy to the UE 410 using a CSR indicator. In some examples, the CSR indicator may be used to indicate transmission strategies, and may be indicated as part of RRC messaging, for example as a CSR information element.

At block 415, the base station 405 may identify a first transmission strategy for downlink transmissions. The first transmission strategy may be a closed-loop MIMO transmission strategy, an open-loop MIMO transmission strategy, or a semi-open-loop MIMO transmission strategy. In some examples, a closed-loop MIMO transmission strategy may be a default transmission strategy for a communication link. Each of these transmission strategies may employed in a single layer three transmission mode. The base station 405 or UE 410 may be configured to modify its transmission strategy and/or feedback strategy while remaining in a single transmission mode. In some cases, the base station 405 may identify the transmission strategy based on information determined by the base station 405. In other cases, the base station 405 may identify the transmission strategy based on information received from the UE 410. In yet other cases, the base station 405 may identify the transmission strategy based on information from both the base station 405 and the UE 410. For example, base station 405 may consider the information from the UE 410 when identifying a transmission strategy, however base station 405 may obtain further information that results in base station 405 not following the recommendation (e.g., suggestion or preference) included in the information from the UE 410.

In some examples, the base station 405 may identify a feedback strategy for receiving feedback from the UE 410. Such feedback strategies may be related to the transmission strategies. For example, the feedback needed by the base station 405 for a closed-loop MIMO transmission strategy is different from feedback needed by the base station 405 for an open-loop MIMO transmission strategy. In some examples, the base station 405 may identify the feedback strategy based on the transmission strategy. In some examples, the base station 405 may identify the feedback strategy independent of the transmission strategy. In some examples, the base station 405 may identify a transmission strategy alone, a feedback strategy alone, or a combination of the two.

After identifying the transmission strategy, the base station 405 may transmit communications 420 to the UE 410 along a downlink channel using the first transmission strategy. The communications may include user-plane data, control-plane information, or combinations thereof.

At block 425, the base station 405 may identify a second transmission strategy different from the first transmission strategy based on channel conditions. The base station 405 may identify one or more channel conditions of the communications 420. For example, the base station 405 may identify the second transmission strategy based on determining that a data transfer rate exceeds a threshold. In some examples, the base station 405 may identify the second transmission strategy based on a modulation and coding scheme satisfying a threshold. In other examples, the base station 405 may identify the second transmission strategy based on poor uplink or downlink channel conditions (e.g., feedback is not getting to the base station 405) or other poor network conditions. In some cases, the base station 405 may determine that an open-loop or semi-open-loop transmission strategy should be employed instead of a closed-loop transmission strategy on the downlink channel.

In some examples, the base station 405 may, alternatively or additionally, identify a second feedback strategy different from the feedback strategy of the communications 420. The base station 405 may identify the feedback strategy based on the identified transmission strategy, channel conditions measured by the UE 410 or the base station 405, or combinations thereof.

At block 430, the base station 405 may generate an indication 435 to inform the UE 410 of the second transmission strategy or the second feedback strategy or both identified by the base station 405. In some communication systems, a UE may be informed about a new transmission strategy based on RRC signaling that configures transmission modes. Here, in wireless communication systems that operate in a transparent communication environment, the indication may be included in other types of signaling. For example, the indication 435 may be included in a CSR information element (sometimes referred to as a CSR field or a CSR indicator) of an RRC message.

When using the CSR field of an RRC message to indicate an identified transmission strategy, the base station 405 may use a bitmap or an index to identify the transmission strategies. One or more unique entries in the CSR field may be reserved to indicate an open-loop transmission strategy or a semi-open-loop transmission strategy. Other entries in the CSR field may be used to indicate CSR data in other transmission strategies, such as closed-loop transmission strategies. The bitmap or index may be preconfigured and known to both the base station 405 and the UE 410.

For example, if the CSR field includes four bits, a bit map or index may include sixteen unique entries. Entries 1-14 may be configured to indicate CSR data, entry 15 may be configured to indicate an open-loop or semi-open-loop transmission strategy that uses PRG based precoding cycling, and entry 16 may be configured to indicate an open-loop or semi-open-loop transmission strategy that uses small delay CDD. The foregoing is provided by way of example only. Other sizes of CSR fields, other sizes of bitmaps or indexes, and/or other configurations of the bitmaps or indexes are contemplated by this disclosure.

In some examples, the UE 410 may transmit an ACK or NACK based on receiving the indication 435. The ACK or NACK may indicate to the base station 405 whether the information about the new transmission strategy or the new feedback strategy was decoded successfully by the UE 410.

At block 445, the base station 405 may modify the transmission strategy and/or feedback strategy based on identifying the new transmission strategy or the new feedback strategy. The base station 405 may make these modifications either before or after transmitting the indication 435.

At block 450, the UE 410 may modify the feedback strategy and/or the transmission strategy based on receiving the indication 435. The UE 410 may decode the indication 435 to identify the specific transmission strategy or the specific feedback strategy selected by the base station 405. The indication of the transmission strategy may provide an assumption for the UE 410 to use to determine the type of feedback used by base station 405. After modifying the transmission strategy and/or feedback strategy, the UE 410 may determine feedback information based on the new transmission strategy or the new feedback strategy. For example, the UE 410 may modify how it calculates CQI based on which transmission strategy is being use or the UE 410 may modify how it calculates CQI based on explicit guidance included in a feedback strategy.

In some cases, the UE 410 may determine a feedback strategy based on the transmission strategy indicated in the indication 435. For example, based on the new transmission strategy being an open-loop MIMO transmission strategy, the UE 410 may adjust how UE 410 determines CQI for the CSI feedback.

After modifying its strategies (either transmission or feedback), the base station 405 may transmit communications 455 to the UE 410 along a downlink channel using the second transmission strategy. The communications 455 may include user-plane data, control-plane information, or combinations thereof. In response to receiving the communications 455 using the second transmission strategy, the UE 410 may transmit feedback 460 to the base station 405 based on the transmission strategy and/or the feedback strategy. For example, if the communications 455 are transmitted using a first transmission strategy, the feedback 460 may include a first set of information (e.g., measurements for parameters associated with the channel, or other calculated values associated with the channel or receiver). If the communications 455 are transmitted using a second transmission strategy different from the first transmission strategy, the feedback 460 may include a second set of information (e.g., measurements for parameters associated with the channel, or other calculated values associated with the channel or receiver) different from the first set.

In some examples, the feedback 460 may be an example of a CSI message. In some examples, the feedback 460 may be an example of a hybrid automatic repeat request (HARQ) feedback. In some examples, the transmission strategy may be transparent to the UE 410. For example, the UE 410 may not be able to identify which transmission strategy is being used based on the content of the communications 420, 455 alone. In such examples, the UE 410 may configure the feedback 460 based on a transmission strategy selected by the UE 410 or a feedback strategy received from the base station 405.

Figure 5:
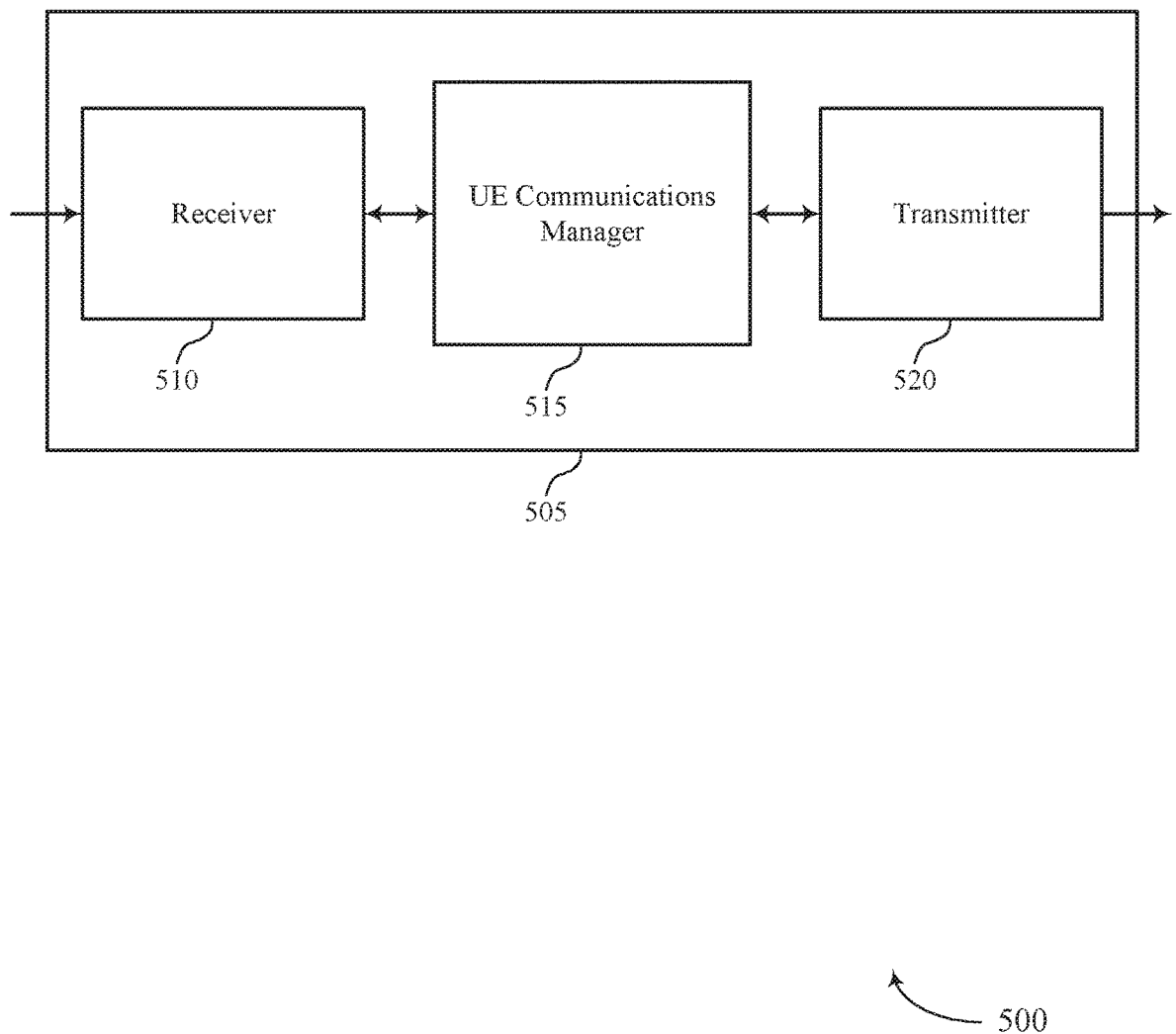
FIGS. 5 through 7 show block diagrams of a device that supports transmission strategy signaling in accordance with aspects of the present disclosure.

FIG. 5 shows a block diagram 500 of a wireless device 505 that supports transmission strategy signaling in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to transmission strategy signaling, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify, by the UE, a transition from a first transmission strategy for a downlink channel to a second transmission strategy for the downlink channel, determine feedback information based on the identified second transmission strategy for the downlink channel, and transmit, to a base station, a CSI message that includes the feedback information and an indication of the transition from the first transmission strategy to the second transmission strategy. The UE communications manager 515 may also receive first data using a first transmission strategy on a downlink channel, receive, from a base station, a CSR indicator that identifies a second transmission strategy for the downlink channel and a feedback strategy for the UE, determine feedback information based on the identified second transmission strategy for the downlink channel and the identified feedback strategy, and transmit, to the base station, a CSI message that includes the feedback information.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
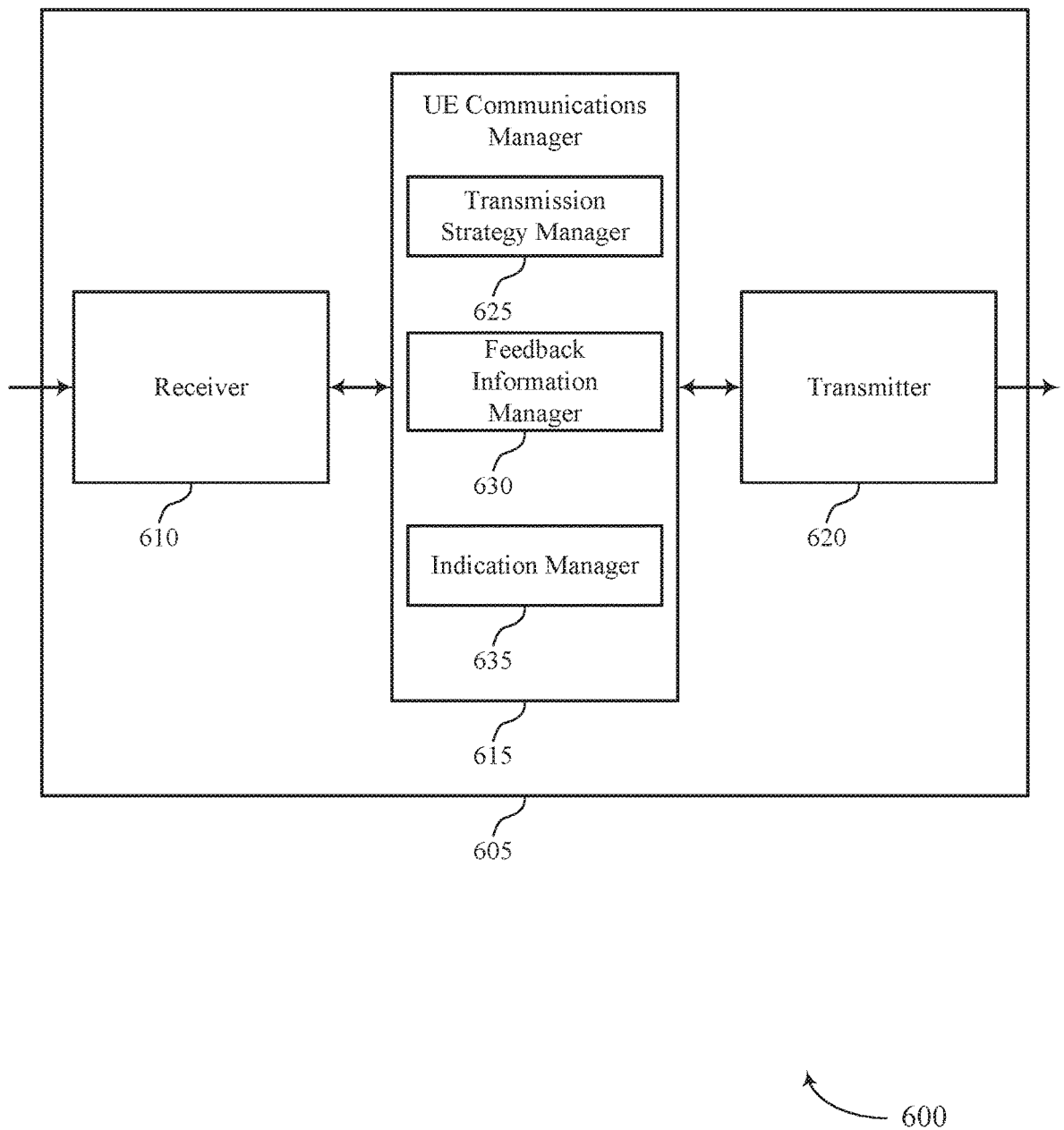

FIG. 6 shows a block diagram 600 of a wireless device 605 that supports transmission strategy signaling in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to transmission strategy signaling, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include transmission strategy manager 625, feedback information manager 630, and indication manager 635.

Transmission strategy manager 625 may identify, by the UE, a transition from a first transmission strategy for a downlink channel to a second transmission strategy for the downlink channel, receive first data using a first transmission strategy on a downlink channel, and receive second data using the second transmission strategy on the downlink channel, where the second data of the second transmission strategy is transmitted using a same layer three transmission mode as the first data of the first transmission strategy. In some cases, the first transmission strategy is a closed-loop MIMO transmission strategy and the second transmission strategy is an open-loop MIMO transmission strategy or a semi-open-loop MIMO transmission strategy. In some cases, the first transmission strategy is the open-loop MIMO transmission strategy, or the semi-open-loop MIMO transmission strategy and the second transmission strategy is the closed-loop MIMO transmission strategy. In some cases, the first transmission strategy is the open-loop MIMO transmission strategy and the second transmission strategy is the semi-open-loop transmission strategy. In some cases, the first transmission strategy is the semi-open-loop MIMO transmission strategy and the second transmission strategy is the open-loop transmission strategy. In some cases, the first transmission strategy, or the second transmission strategy, or a combination thereof include a transmission mode.

Feedback information manager 630 may determine feedback information based on the identified second transmission strategy for the downlink channel, determine feedback information based on the identified second transmission strategy for the downlink channel and the identified feedback strategy, and transmit, to the base station, a CSI message that includes the feedback information.

Indication manager 635 may transmit, to a base station, a CSI message that includes the feedback information and an indication of the transition from the first transmission strategy to the second transmission strategy, transmit the indication using layer two signaling or layer one signaling, the indication identifying the second transmission strategy for the downlink channel. In some cases, indication manager 635 may receive, from a base station, a CSR indicator that identifies a second transmission strategy for the downlink channel and a feedback strategy for the UE and identify a preconfigured CSR index for the identified second transmission strategy and the identified feedback strategy based on the CSR indicator. In some cases, the indication includes a request for the base station to modify its transmission protocol for the downlink channel to the second transmission strategy.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
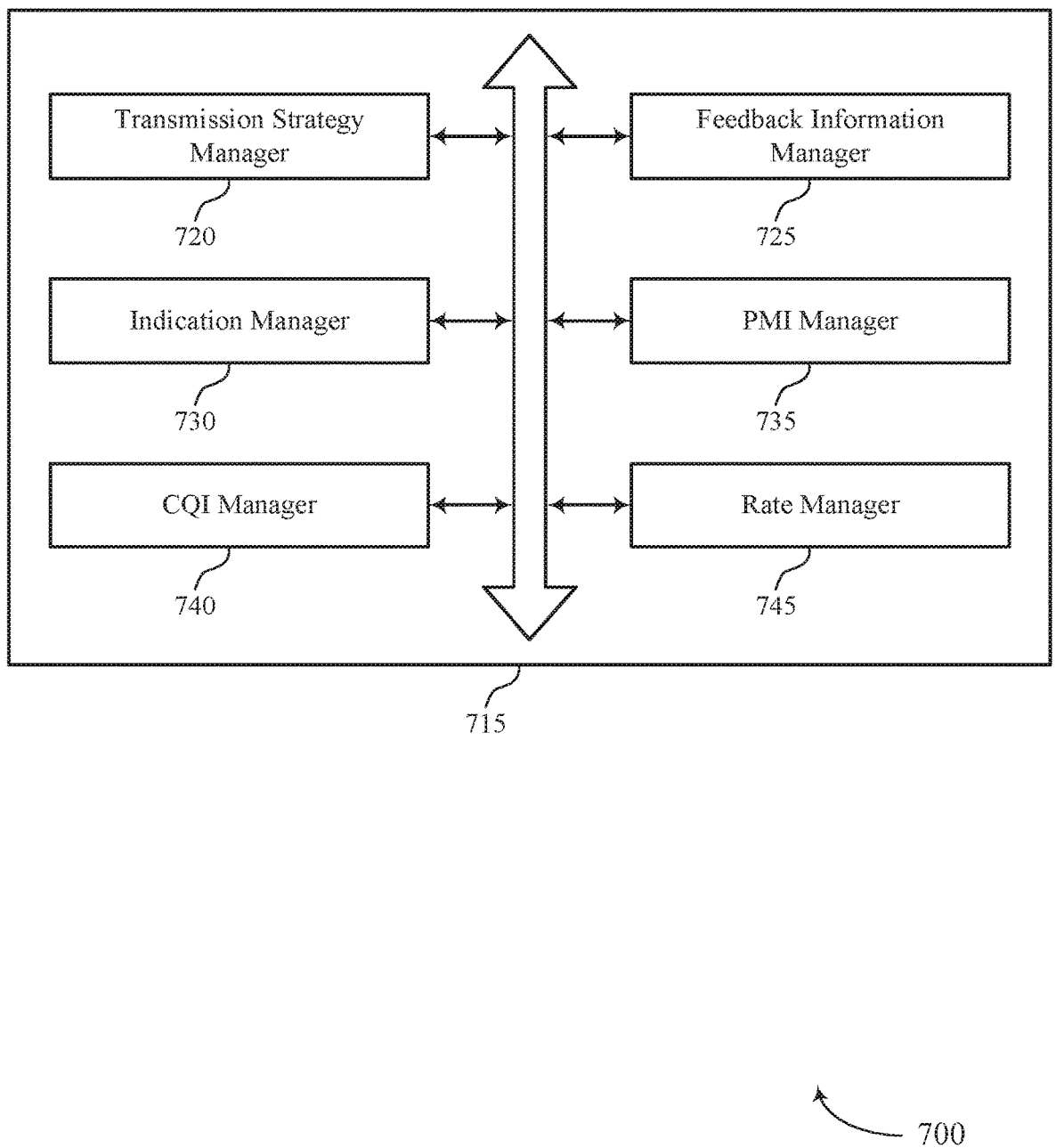

FIG. 7 shows a block diagram 700 of a UE communications manager 715 that supports transmission strategy signaling in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include transmission strategy manager 720, feedback information manager 725, indication manager 730, PMI manager 735, CQI manager 740, and rate manager 745. Each of these modules may communicate, directly or indirectly, with one another (e.g., via one or more buses).

Transmission strategy manager 720 may identify, by the UE, a transition from a first transmission strategy for a downlink channel to a second transmission strategy for the downlink channel, receive first data using a first transmission strategy on a downlink channel, and receive second data using the second transmission strategy on the downlink channel, where the second data of the second transmission strategy is transmitted using a same layer three transmission mode as the first data of the first transmission strategy. In some cases, the first transmission strategy is a closed-loop MIMO transmission strategy and the second transmission strategy is an open-loop MIMO transmission strategy or a semi-open-loop MIMO transmission strategy. In some cases, the first transmission strategy is the open-loop MIMO transmission strategy, or the semi-open-loop MIMO transmission strategy and the second transmission strategy is the closed-loop MIMO transmission strategy. In some cases, the first transmission strategy, or the second transmission strategy, or a combination thereof include a transmission mode. In some cases, the first transmission strategy is the open-loop MIMO transmission strategy and the second transmission strategy is the semi-open-loop transmission strategy. In some cases, the first transmission strategy is the semi-open-loop MIMO transmission strategy and the second transmission strategy is the open-loop transmission strategy.

Feedback information manager 725 may determine feedback information based on the identified second transmission strategy for the downlink channel, determine feedback information based on the identified second transmission strategy for the downlink channel and the identified feedback strategy, and transmit, to the base station, a CSI message that includes the feedback information.

Indication manager 730 may transmit, to a base station, a CSI message that includes the feedback information and an indication of the transition from the first transmission strategy to the second transmission strategy, and transmit the indication using layer two signaling or layer one signaling, the indication identifying the second transmission strategy for the downlink channel. Indication manager 730 may also receive, from a base station, a CSR indicator that identifies a second transmission strategy for the downlink channel and a feedback strategy for the UE and identify a preconfigured CSR index for the identified second transmission strategy and the identified feedback strategy based on the CSR indicator. In some cases, the indication includes a request for the base station to modify its transmission protocol for the downlink channel to the second transmission strategy.

PMI manager 735 may transmit the indication in a PMI field of the CSI message, the indication identifying the second transmission strategy for the downlink channel and identify a preconfigured or predefined PMI entry based on identifying the transition to the second transmission strategy, where the indication is the preconfigured or predefined PMI entry. In some cases, a first preconfigured entry of the PMI field indicates that the second transmission strategy is based on RBG based precoder-cycling or on PRG based precoder-cycling. In some cases, a second preconfigured entry of the PMI field indicates that the second transmission strategy is based on small delay CDD.

CQI manager 740 may determine a CQI of the CSI message based on identifying the transition to the second transmission strategy being in the PMT field of the CSI message, where the CSI message includes the determined CQI.

Rate manager 745 may identify a data transfer rate of the first transmission strategy for the downlink channel, where the indication of the transition to the second transmission strategy for the downlink channel is based on the data transfer rate.

Figure 8:
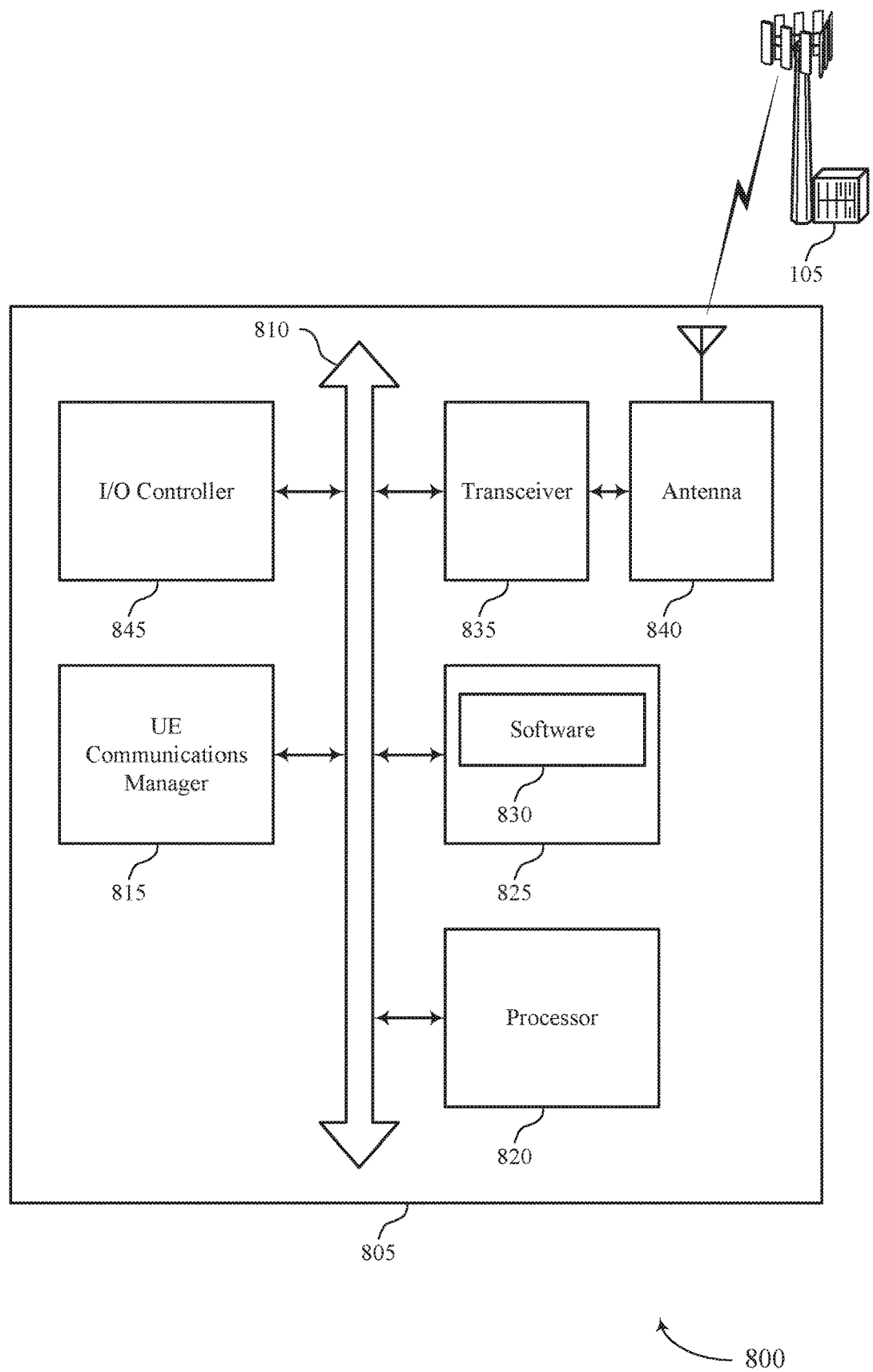
FIG. 8 illustrates a block diagram of a system including a UE that supports transmission strategy signaling in accordance with aspects of the present disclosure.

FIG. 8 shows a diagram of a system 800 including a device 805 that supports transmission strategy signaling in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting transmission strategy signaling).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support transmission strategy signaling. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
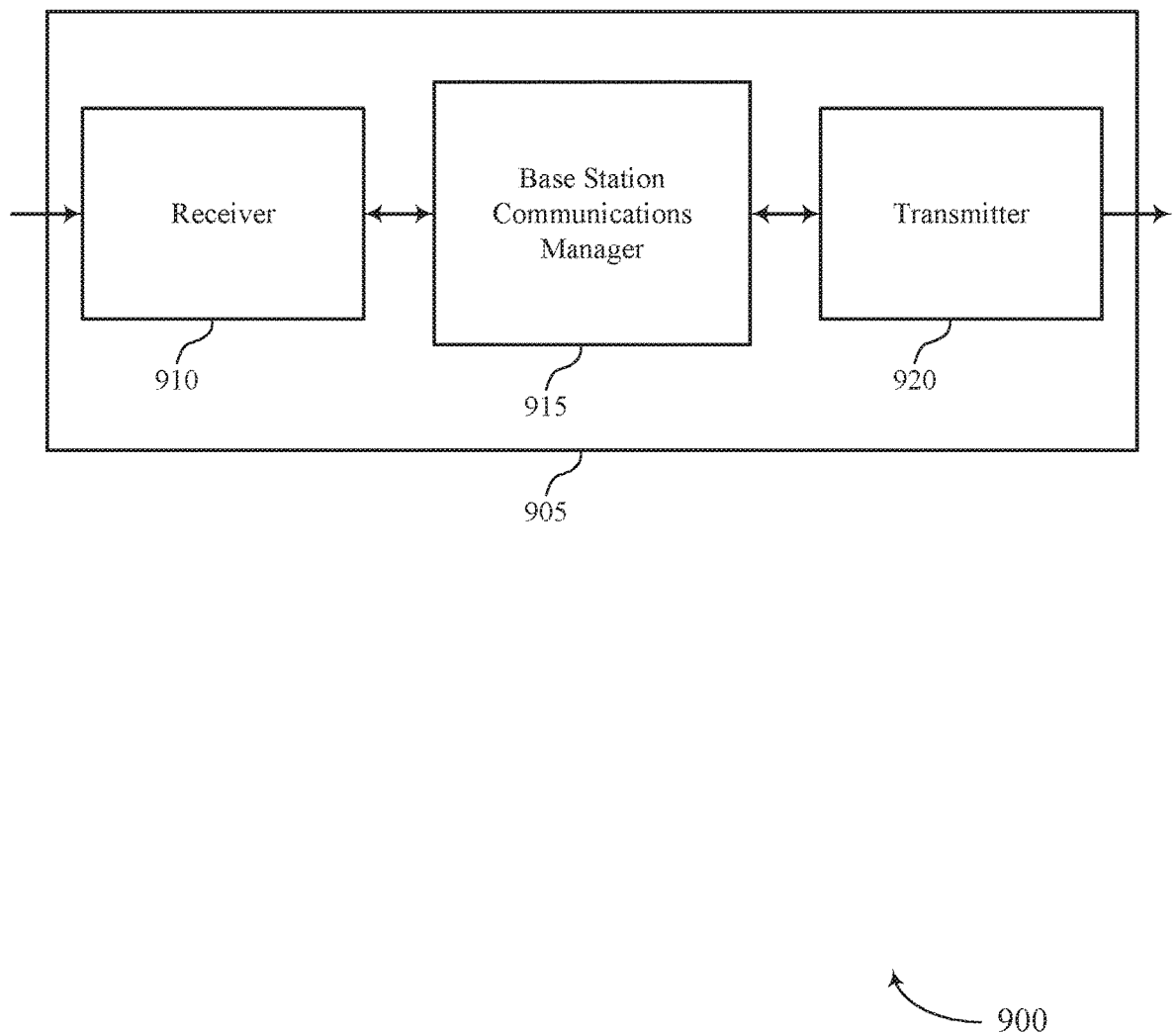
FIGS. 9 through 11 show block diagrams of a device that supports transmission strategy signaling in accordance with aspects of the present disclosure.

FIG. 9 shows a block diagram 900 of a wireless device 905 that supports transmission strategy signaling in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to transmission strategy signaling, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may transmit first data using a first transmission strategy on a downlink channel, receive, from a UE, a CSI message that includes feedback information and an indication of a transition from the first transmission strategy to a second transmission strategy for the downlink channel, and transmit second data using the second transmission strategy on the downlink channel based on receiving the indication. The base station communications manager 915 may also transmit, to a UE, first data using a first transmission strategy on a downlink channel, identify a second transmission strategy for the downlink channel and a feedback strategy for the UE, transmit a CSR indicator that identifies the second transmission strategy and the feedback strategy, and receive a CSI message based on the feedback strategy identified by the CSR indicator.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
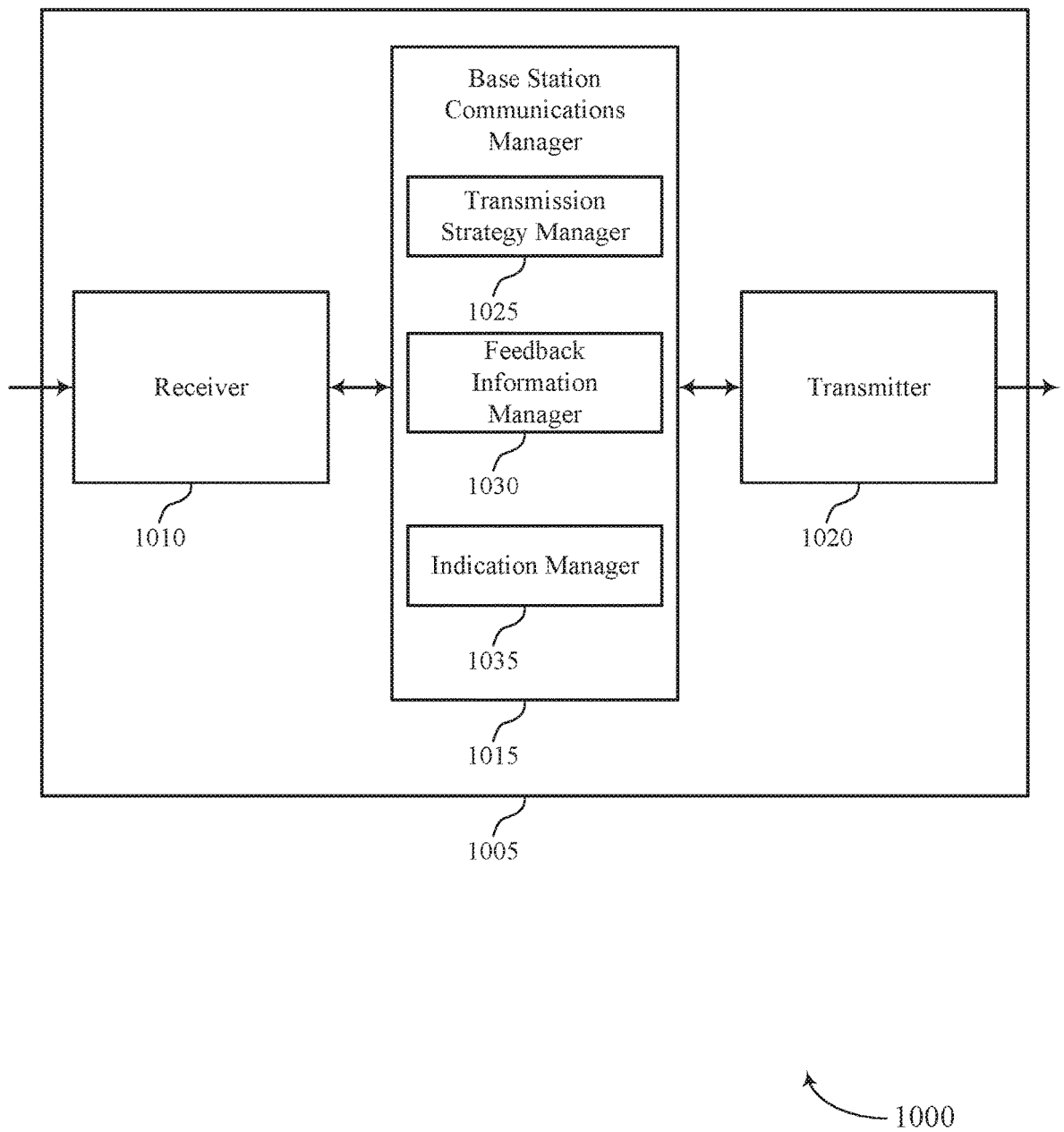

FIG. 10 shows a block diagram 1000 of a wireless device 1005 that supports transmission strategy signaling in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to transmission strategy signaling, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include transmission strategy manager 1025, feedback information manager 1030, and indication manager 1035.

Transmission strategy manager 1025 may transmit first data using a first transmission strategy on a downlink channel, transmit, to the UE, second data using the second transmission strategy on the downlink channel, where the second data of the second transmission strategy is transmitted using a same layer three transmission mode as the first data of the first transmission strategy, transmit second data using the second transmission strategy on the downlink channel based on receiving the indication, identify a second transmission strategy for the downlink channel and a feedback strategy for the UE, and transmit, to a UE, first data using a first transmission strategy on a downlink channel. In some cases, the first transmission strategy is a closed-loop MIMO transmission strategy and the second transmission strategy is an open-loop MIMO transmission strategy or a semi-open-loop MIMO transmission strategy. In some cases, the first transmission strategy is the open-loop MIMO transmission strategy, or the semi-open-loop MIMO transmission strategy and the second transmission strategy is the closed-loop MIMO transmission strategy. In some cases, the first transmission strategy, or the second transmission strategy, or a combination thereof include a transmission mode. In some cases, the first transmission strategy is the open-loop MIMO transmission strategy and the second transmission strategy is the semi-open-loop transmission strategy. In some cases, the first transmission strategy is the semi-open-loop MIMO transmission strategy and the second transmission strategy is the open-loop transmission strategy.

Feedback information manager 1030 may receive, from a UE, a CSI message that includes feedback information and an indication of a transition from the first transmission strategy to a second transmission strategy for the downlink channel and receive a CSI message based on the feedback strategy identified by the CSR indicator.

Indication manager 1035 may transmit a CSR indicator that identifies the second transmission strategy and the feedback strategy. In some cases, information in the CSI message for the second transmission strategy is different from information in a CSI message for the first transmission strategy. In some cases, the indication is received using layer two signaling or layer one signaling. In some cases, a PMI field of the CSI message includes the indication. In some cases, the indication includes a request for the base station to modify its transmission protocol for the downlink channel to the second transmission strategy.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
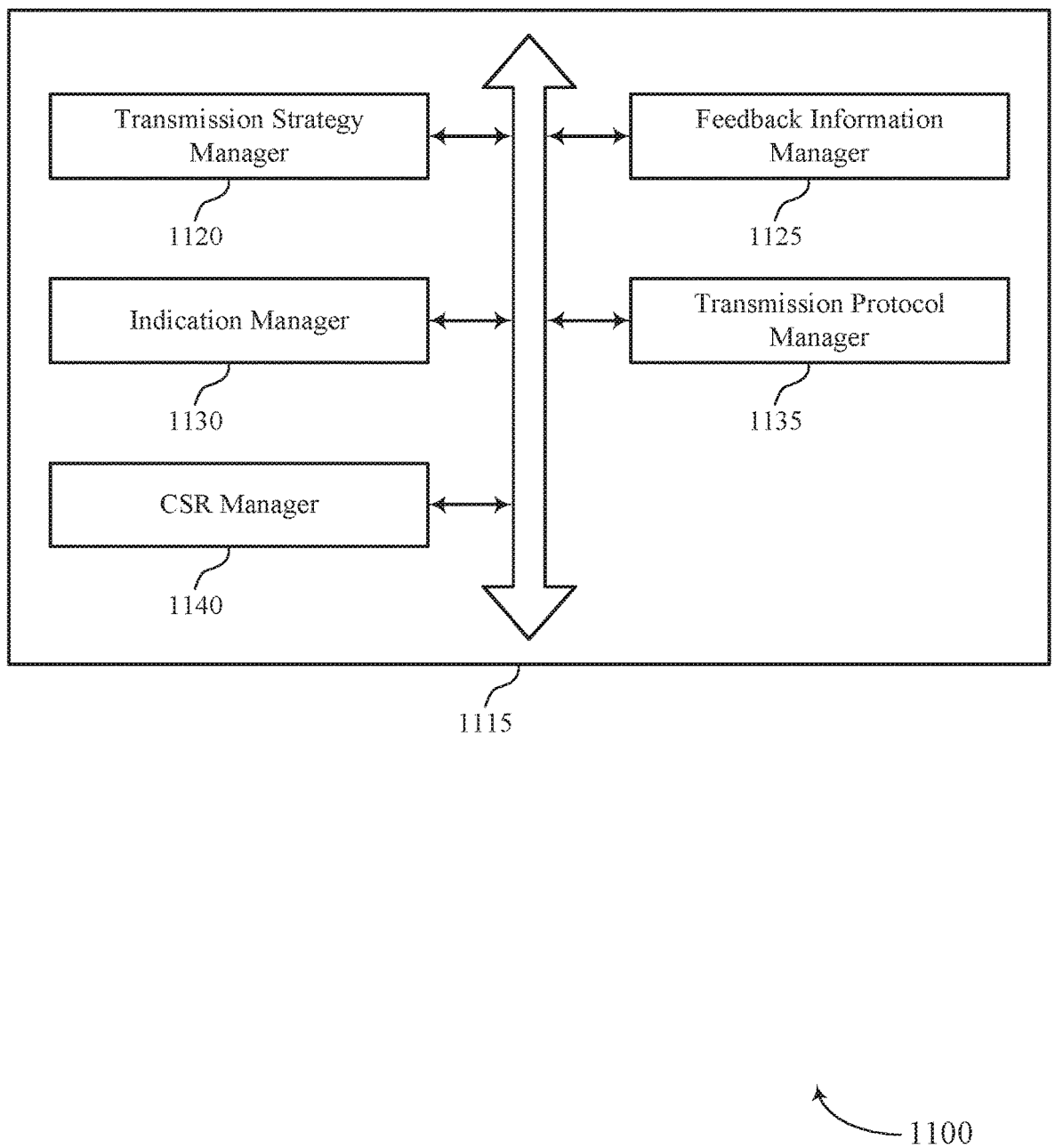

FIG. 11 shows a block diagram 1100 of a base station communications manager 1115 that supports transmission strategy signaling in accordance with aspects of the present disclosure. The base station communications manager 1115 may be an example of aspects of a base station communications manager 1215 described with reference to FIGS. 9, 10, and 12. The base station communications manager 1115 may include transmission strategy manager 1120, feedback information manager 1125, indication manager 1130, transmission protocol manager 1135, and CSR manager 1140. Each of these modules may communicate, directly or indirectly, with one another (e.g., via one or more buses).

Transmission strategy manager 1120 may transmit first data using a first transmission strategy on a downlink channel, transmit, to the UE, second data using the second transmission strategy on the downlink channel, where the second data of the second transmission strategy is transmitted using a same layer three transmission mode as the first data of the first transmission strategy, transmit second data using the second transmission strategy on the downlink channel based on receiving the indication, identify a second transmission strategy for the downlink channel and a feedback strategy for the UE, and transmit, to a UE, first data using a first transmission strategy on a downlink channel. In some cases, the first transmission strategy is a closed-loop MIMO transmission strategy and the second transmission strategy is an open-loop MIMO transmission strategy or a semi-open-loop MIMO transmission strategy. In some cases, the first transmission strategy is the open-loop MIMO transmission strategy, or the semi-open-loop MIMO transmission strategy and the second transmission strategy is the closed-loop MIMO transmission strategy. In some cases, the first transmission strategy, or the second transmission strategy, or a combination thereof include a transmission mode. In some cases, the first transmission strategy is the open-loop MIMO transmission strategy and the second transmission strategy is the semi-open-loop transmission strategy. In some cases, the first transmission strategy is the semi-open-loop MIMO transmission strategy and the second transmission strategy is the open-loop transmission strategy.

Feedback information manager 1125 may receive, from a UE, a CSI message that includes feedback information and an indication of a transition from the first transmission strategy to a second transmission strategy for the downlink channel and receive a CSI message based on the feedback strategy identified by the CSR indicator.

Indication manager 1130 may transmit a CSR indicator that identifies the second transmission strategy and the feedback strategy. In some cases, information in the CSI message for the second transmission strategy is different from information in a CSI message for the first transmission strategy. In some cases, the indication is received using layer two signaling or layer one signaling. In some cases, a PMI field of the CSI message includes the indication. In some cases, the indication includes a request for the base station to modify its transmission protocol for the downlink channel to the second transmission strategy.

Transmission protocol manager 1135 may modify a transmission protocol of the base station based on receiving the indication of the second transmission strategy, where transmitting the second data is based on the modified transmission protocol.

CSR manager 1140 may identify a preconfigured CSR index for the second transmission strategy and the feedback strategy, where the CSR indicator is the preconfigured CSR index, transmit a first CSR indicator that identifies the first transmission strategy and the feedback strategy, transmit a second CSR indicator that identifies the second transmission strategy and the feedback strategy, and transmit a subset of the first CSR indicator as the second CSR indicator.

Figure 12:
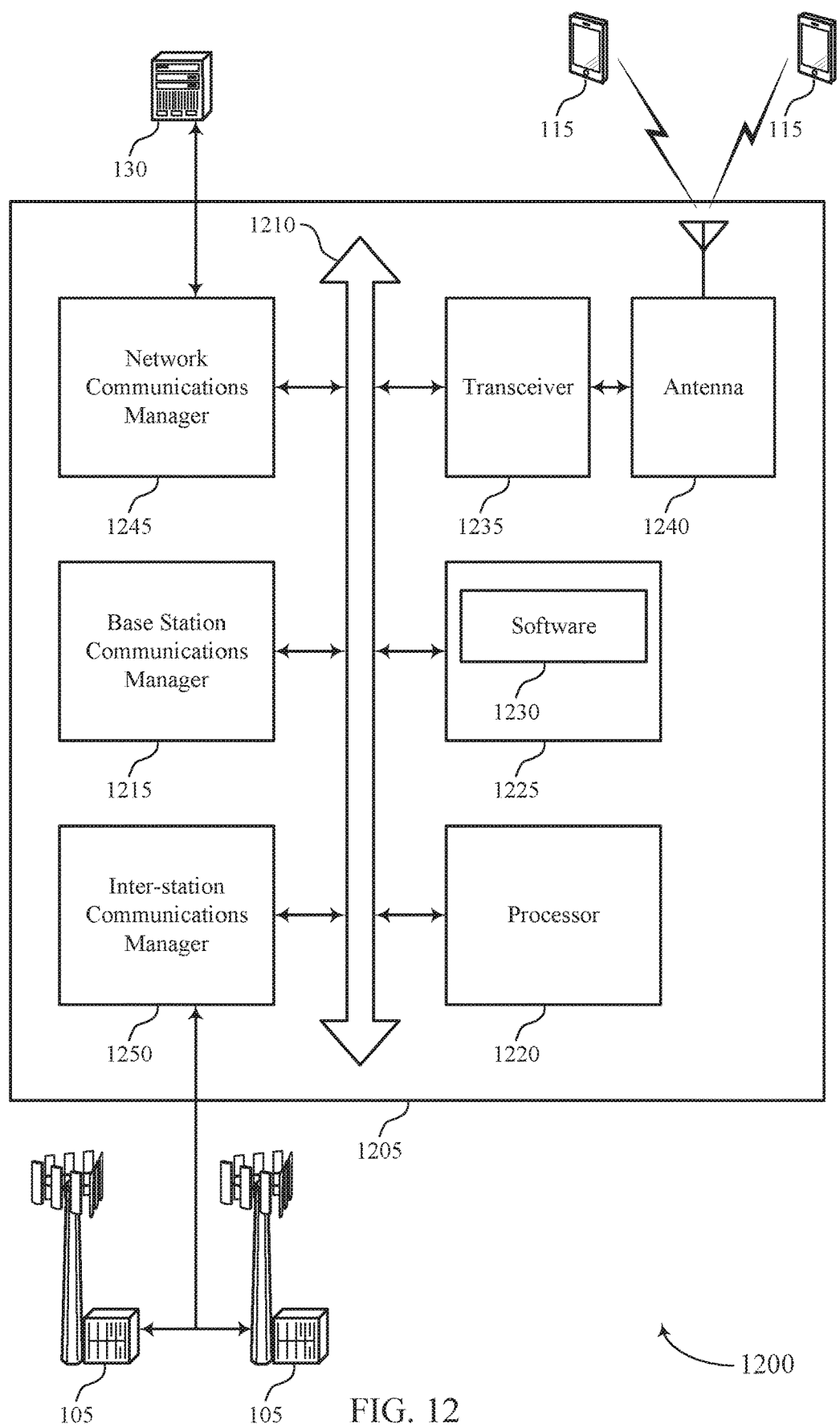
FIG. 12 illustrates a block diagram of a system including a base station that supports transmission strategy signaling in accordance with aspects of the present disclosure.

FIG. 12 shows a diagram of a system 1200 including a device 1205 that supports transmission strategy signaling in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting transmission strategy signaling).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support transmission strategy signaling. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105 and may include a controller or scheduler for controlling communications with UEs 115 in cooperation with other base station 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
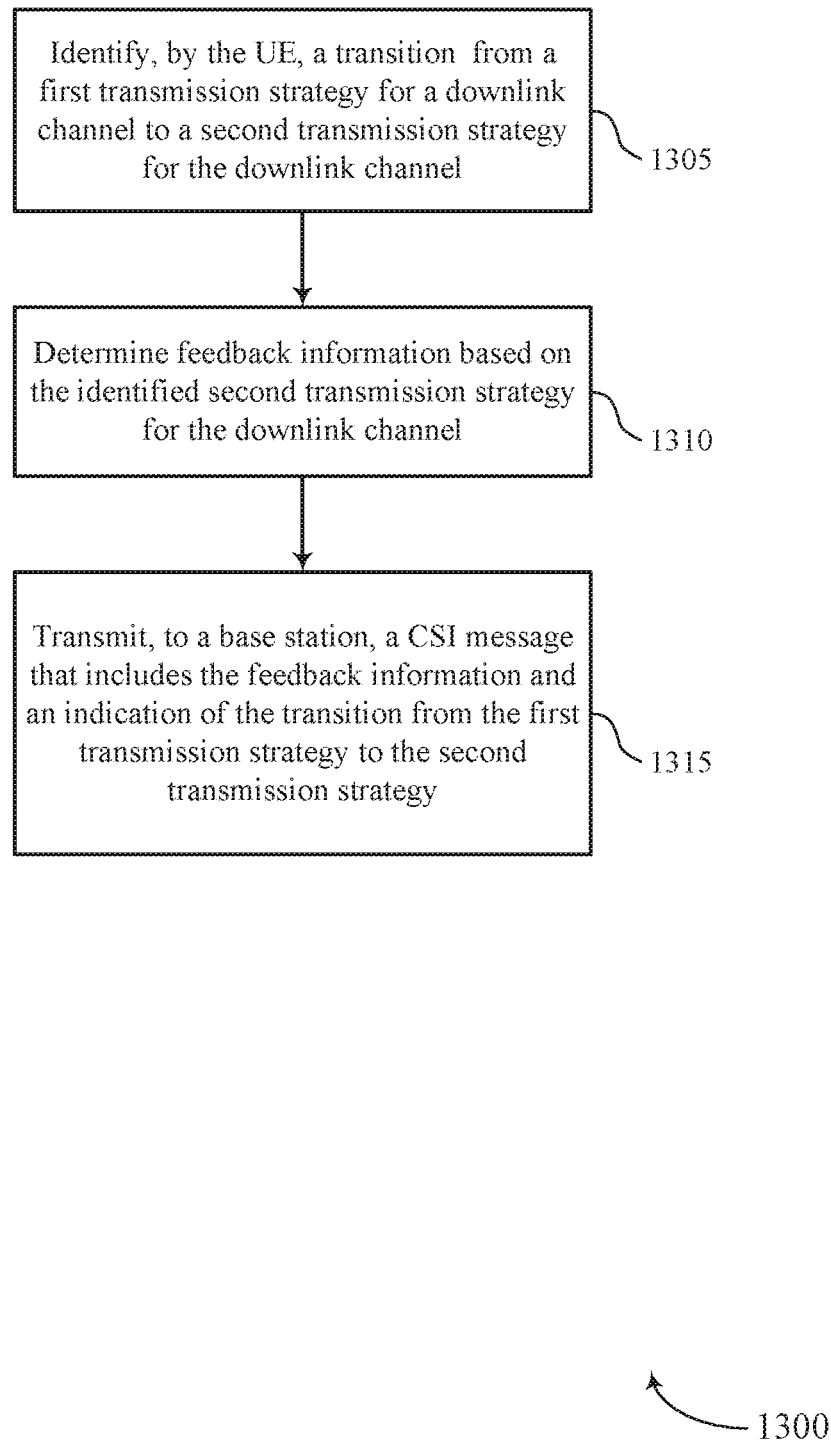
FIGS. 13 through 17 illustrate methods for transmission strategy signaling in accordance with aspects of the present disclosure.

FIG. 13 shows a flowchart illustrating a method 1300 for transmission strategy signaling in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify, by the UE, a transition from a first transmission strategy for a downlink channel to a second transmission strategy for the downlink channel. The operations of block 1305 may be performed according to the methods described herein. In certain examples, aspects of the operations of block 1305 may be performed by a transmission strategy manager as described with reference to FIGS. 5 through 8.

At block 1310 the UE 115 may determine feedback information based at least in part on the identified second transmission strategy for the downlink channel. The operations of block 1310 may be performed according to the methods described herein. In certain examples, aspects of the operations of block 1310 may be performed by a feedback information manager as described with reference to FIGS. 5 through 8.

At block 1315 the UE 115 may transmit, to a base station, a CSI message that includes the feedback information and an indication of the transition from the first transmission strategy to the second transmission strategy. The operations of block 1315 may be performed according to the methods described herein. In certain examples, aspects of the operations of block 1315 may be performed by an indication manager as described with reference to FIGS. 5 through 8.

Figure 14:
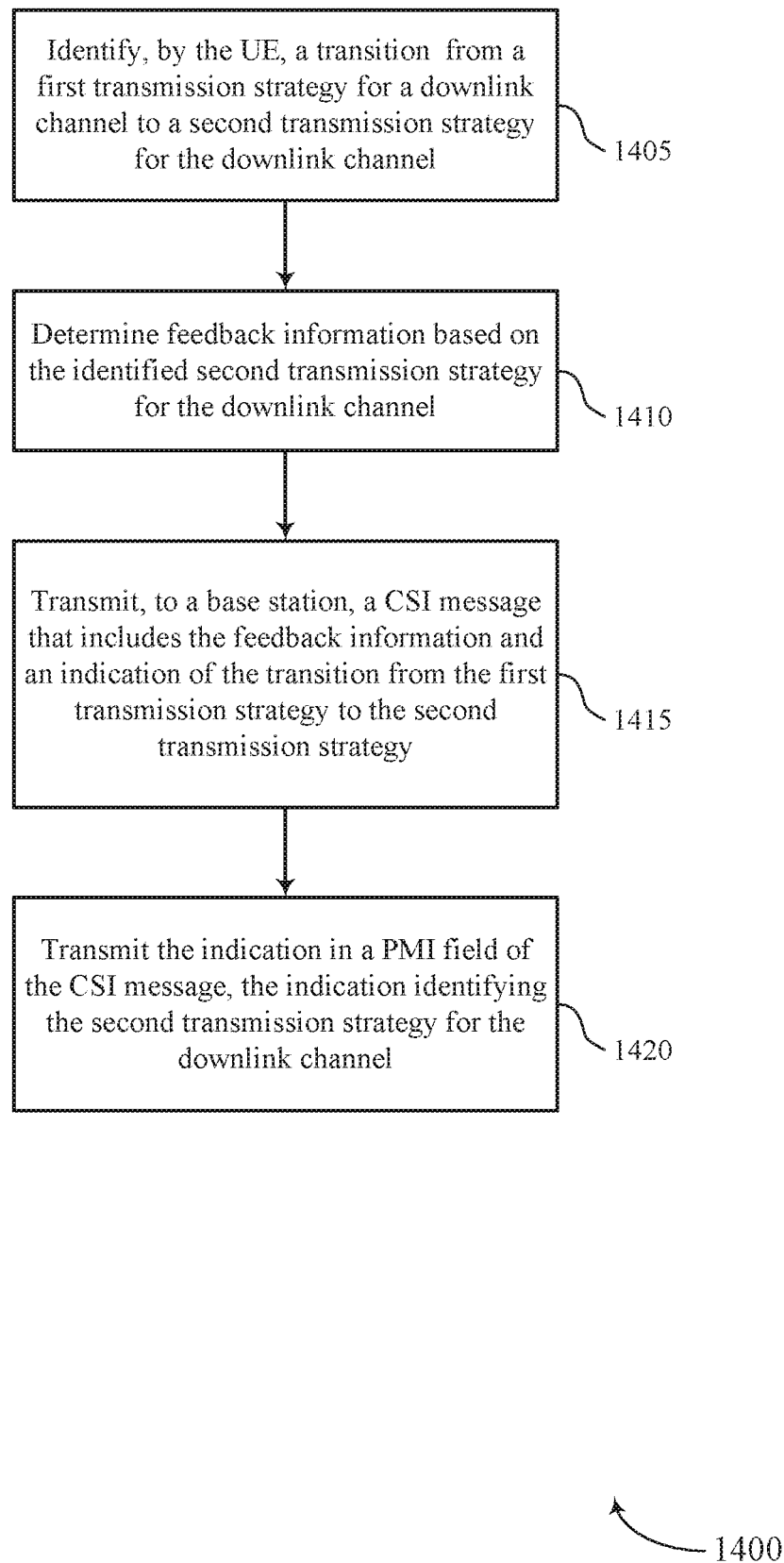

FIG. 14 shows a flowchart illustrating a method 1400 for transmission strategy signaling in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify, by the UE, a transition from a first transmission strategy for a downlink channel to a second transmission strategy for the downlink channel. The operations of block 1405 may be performed according to the methods described herein. In certain examples, aspects of the operations of block 1405 may be performed by a transmission strategy manager as described with reference to FIGS. 5 through 8.

At block 1410 the UE 115 may determine feedback information based at least in part on the identified second transmission strategy for the downlink channel. The operations of block 1410 may be performed according to the methods described herein. In certain examples, aspects of the operations of block 1410 may be performed by a feedback information manager as described with reference to FIGS. 5 through 8.

At block 1415 the UE 115 may transmit, to a base station, a CSI message that includes the feedback information and an indication of the transition from the first transmission strategy to the second transmission strategy. The operations of block 1415 may be performed according to the methods described herein. In certain examples, aspects of the operations of block 1415 may be performed by an indication manager as described with reference to FIGS. 5 through 8.

At block 1420 the UE 115 may transmit the indication in a PMI field of the CSI message, the indication identifying the second transmission strategy for the downlink channel. The operations of block 1420 may be performed according to the methods described herein. In certain examples, aspects of the operations of block 1420 may be performed by a PMI manager as described with reference to FIGS. 5 through 8.

Figure 15:
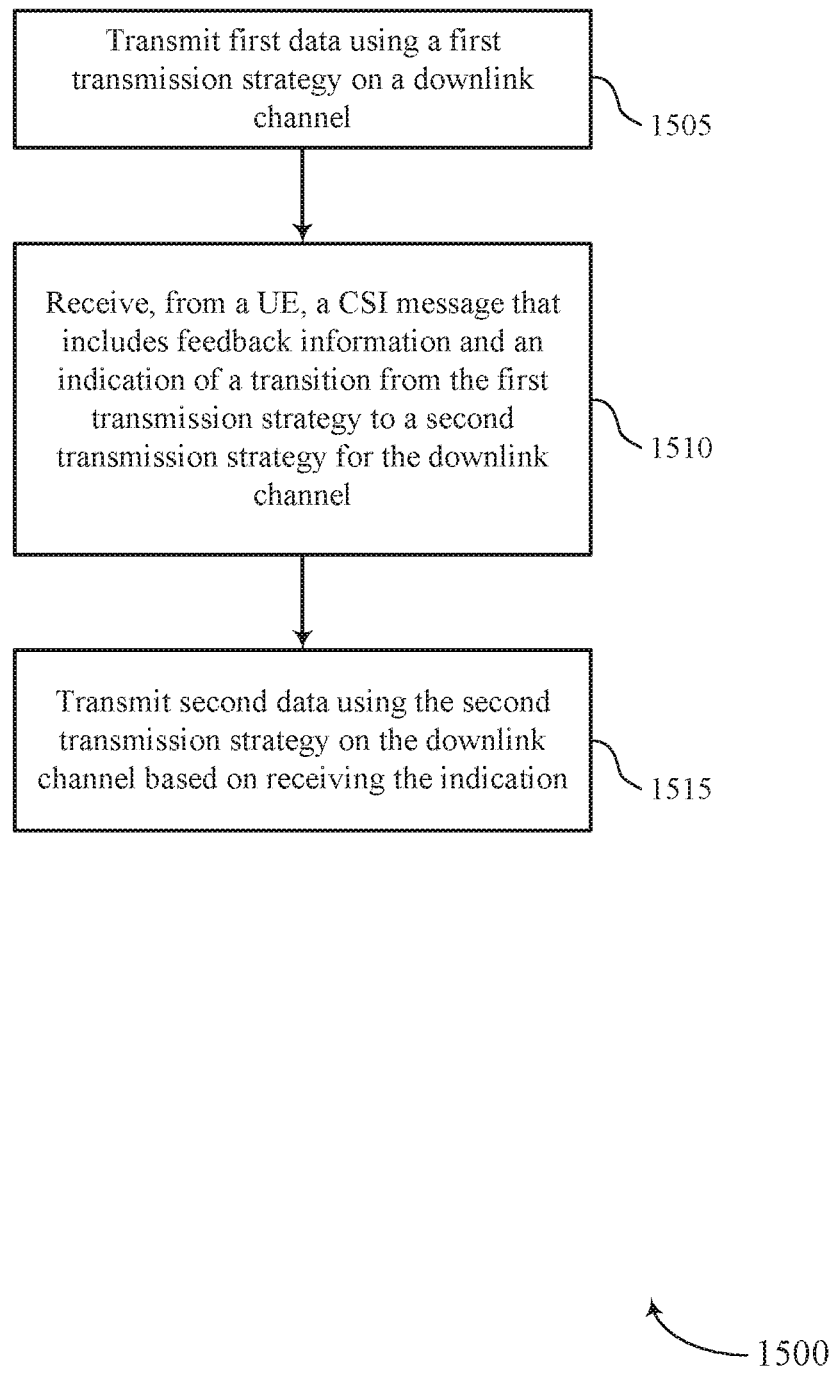

FIG. 15 shows a flowchart illustrating a method 1500 for transmission strategy signaling in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit first data using a first transmission strategy on a downlink channel. The operations of block 1505 may be performed according to the methods described herein. In certain examples, aspects of the operations of block 1505 may be performed by a transmission strategy manager as described with reference to FIGS. 9 through 12.

At block 1510 the base station 105 may receive, from a UE, a CSI message that includes feedback information and an indication of a transition from the first transmission strategy to a second transmission strategy for the downlink channel. The operations of block 1510 may be performed according to the methods described herein. In certain examples, aspects of the operations of block 1510 may be performed by a feedback information manager as described with reference to FIGS. 9 through 12.

At block 1515 the base station 105 may transmit second data using the second transmission strategy on the downlink channel based at least in part on receiving the indication. The operations of block 1515 may be performed according to the methods described herein. In certain examples, aspects of the operations of block 1515 may be performed by a transmission strategy manager as described with reference to FIGS. 9 through 12.

Figure 16:
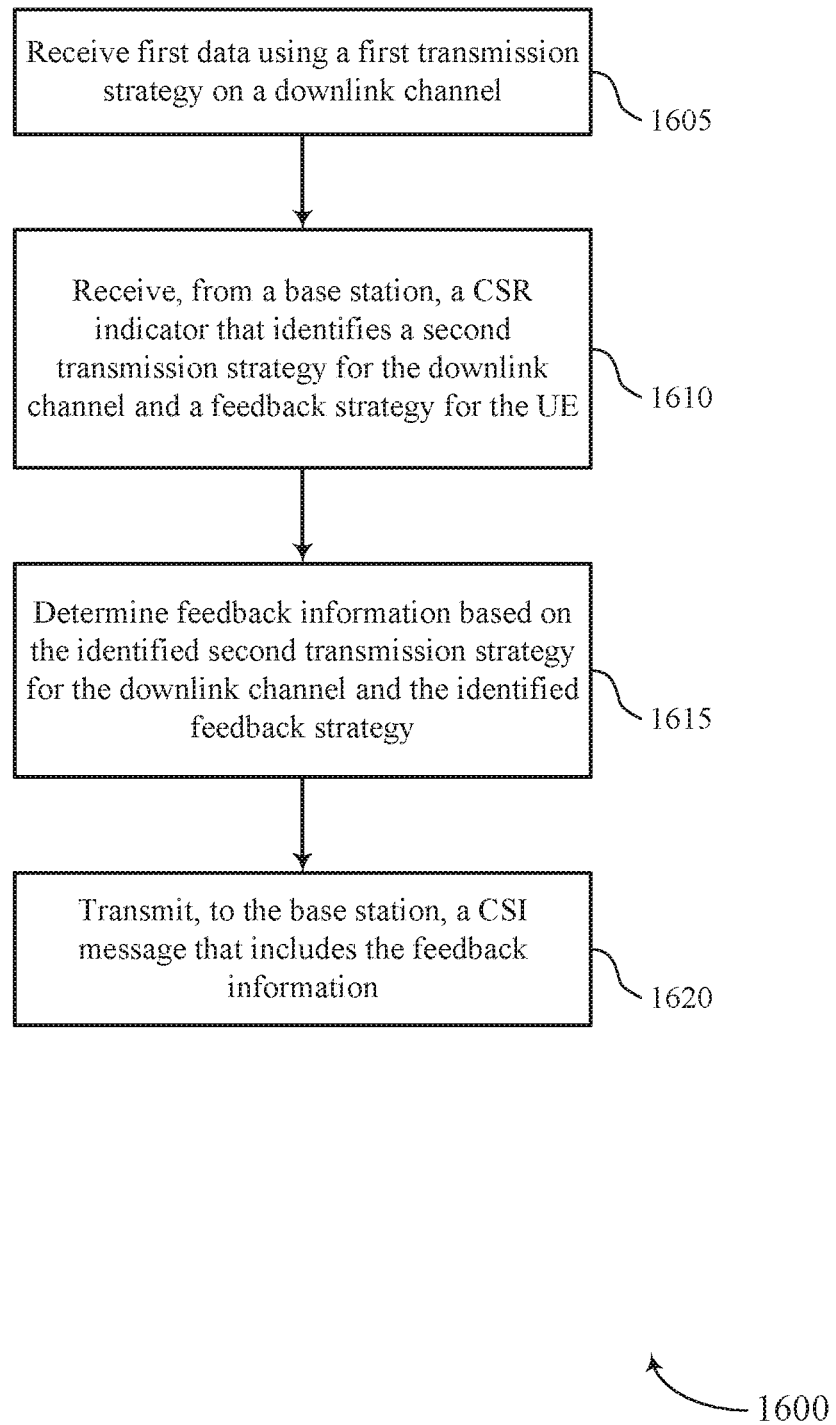

FIG. 16 shows a flowchart illustrating a method 1600 for transmission strategy signaling in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive first data using a first transmission strategy on a downlink channel. The operations of block 1605 may be performed according to the methods described herein. In certain examples, aspects of the operations of block 1605 may be performed by a transmission strategy manager as described with reference to FIGS. 5 through 8.

At block 1610 the UE 115 may receive, from a base station, a CSR indicator that identifies a second transmission strategy for the downlink channel and a feedback strategy for the UE. The operations of block 1610 may be performed according to the methods described herein. In certain examples, aspects of the operations of block 1610 may be performed by an indication manager as described with reference to FIGS. 5 through 8.

At block 1615 the UE 115 may determine feedback information based at least in part on the identified second transmission strategy for the downlink channel and the identified feedback strategy. The operations of block 1615 may be performed according to the methods described herein. In certain examples, aspects of the operations of block 1615 may be performed by a feedback information manager as described with reference to FIGS. 5 through 8.

At block 1620 the UE 115 may transmit, to the base station, a CSI message that includes the feedback information. The operations of block 1620 may be performed according to the methods described herein. In certain examples, aspects of the operations of block 1620 may be performed by a feedback information manager as described with reference to FIGS. 5 through 8.

Figure 17:
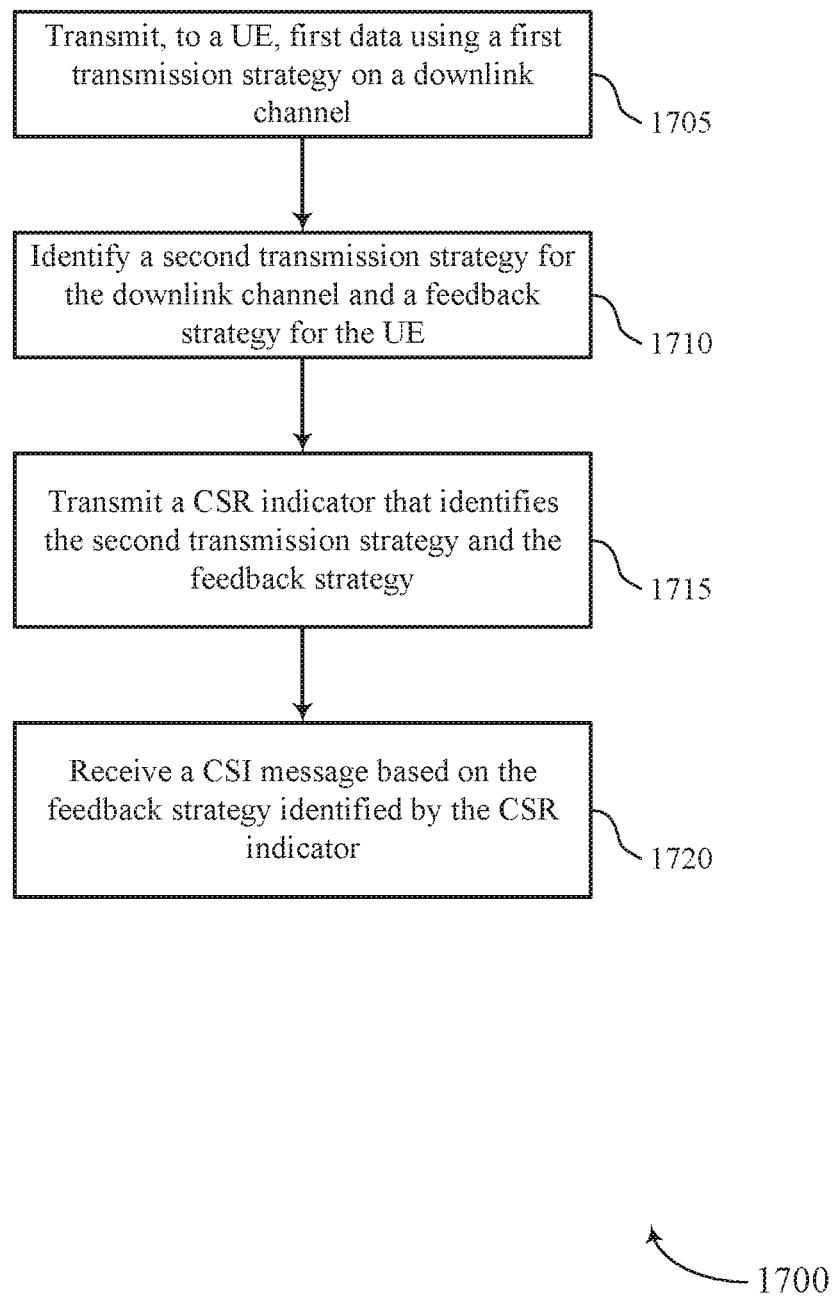

FIG. 17 shows a flowchart illustrating a method 1700 for transmission strategy signaling in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may transmit, to a UE, first data using a first transmission strategy on a downlink channel. The operations of block 1705 may be performed according to the methods described herein. In certain examples, aspects of the operations of block 1705 may be performed by a transmission strategy manager as described with reference to FIGS. 9 through 12.

At block 1710 the base station 105 may identify a second transmission strategy for the downlink channel and a feedback strategy for the UE. The operations of block 1710 may be performed according to the methods described herein. In certain examples, aspects of the operations of block 1710 may be performed by a transmission strategy manager as described with reference to FIGS. 9 through 12.

At block 1715 the base station 105 may transmit a CSR indicator that identifies the second transmission strategy and the feedback strategy. The operations of block 1715 may be performed according to the methods described herein. In certain examples, aspects of the operations of block 1715 may be performed by an indication manager as described with reference to FIGS. 9 through 12.

At block 1720 the base station 105 may receive a CSI message based at least in part on the feedback strategy identified by the CSR indicator. The operations of block 1720 may be performed according to the methods described herein. In certain examples, aspects of the operations of block 1720 may be performed by a feedback information manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communication system 200 of FIGS. 1 and 2—may include one or more carriers, where each carrier may be a signal made up of multiple subcarriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), the method comprising:
identifying, by the UE, a transition from a first transmission strategy for a downlink channel to a second transmission strategy for the downlink channel based at least in part on a data transfer rate;
determining feedback information based at least in part on the second transmission strategy for the downlink channel; and
transmitting, to a network device, a channel state information (CSI) message that includes the feedback information and a precoding matrix indicator (PMI) field, wherein the PMI field includes an indication of the second transmission strategy, and wherein the second transmission strategy is an open-loop multiple input multiple output (MIMO) transmission strategy.

2. The method of claim 1, wherein:
the first transmission strategy is a closed-loop MIMO transmission strategy; or
the first transmission strategy is a semi-open-loop MIMO transmission strategy.

3. The method of claim 1, wherein:
the first transmission strategy, or the second transmission strategy, or a combination thereof comprise a transmission mode.

4. The method of claim 1, wherein transmitting the CSI message further comprises:
transmitting the CSI message that includes the PMI field that includes the indication of the second transmission strategy utilizing layer two signaling or layer one signaling, the indication identifying the second transmission strategy for the downlink channel.

5. The method of claim 1, further comprising:
identifying a preconfigured or predefined PMI entry based at least in part on identifying the transition to the second transmission strategy, wherein the indication of the second transmission strategy is the preconfigured or predefined PMI entry.

6. The method of claim 1, further comprising:
determining a channel quality indicator (CQI) of the CSI message based at least in part on the indication of the second transmission strategy being in the PMI field of the CSI message, wherein the CSI message includes the determined CQI.

7. The method of claim 1, wherein:
a first preconfigured entry of the PMI field indicates that the second transmission strategy is based at least in part on resource block group (RBG) based precoder-cycling or on precoding resource block group (PRG) based precoder-cycling; and
a second preconfigured entry of the PMI field indicates that the second transmission strategy is based at least in part on small delay cyclic delay diversity (CDD).

8. The method of claim 1, wherein the data transfer rate is associated with the first transmission strategy for the downlink channel, and wherein transmitting the CSI message further comprises:
transmitting the CSI message that includes the PMI field that includes the indication of the second transmission strategy for the downlink channel based at least in part on the data transfer rate.

9. The method of claim 1, wherein the indication of the second transmission strategy includes a request for the network device to modify its transmission protocol for the downlink channel to the second transmission strategy.

10. A method for wireless communication at a network device, the method comprising:
transmitting first data utilizing a first transmission strategy on a downlink channel;
receiving, from a user equipment (UE), a channel state information (CSI) message that includes feedback information and a precoding matrix indicator (PMI) field, wherein the PMI field includes an indication of a second transmission strategy for the downlink channel; and
transmitting second data utilizing the second transmission strategy on the downlink channel based at least in part on a data transfer rate and receiving the CSI message, wherein the second transmission strategy is an open-loop multiple input multiple output (MIMO) transmission strategy.

11. The method of claim 10, wherein:
the first transmission strategy is a closed-loop MIMO transmission strategy; or
the first transmission strategy is a semi-open-loop MIMO transmission strategy.

12. The method of claim 10, wherein:
the first transmission strategy, or the second transmission strategy, or a combination thereof comprise a transmission mode.

13. The method of claim 10, further comprising:
modifying a transmission protocol of the network device based at least in part on receiving the CSI message that includes the PMI field that includes the indication of the second transmission strategy, wherein transmitting the second data is based at least in part on the modified transmission protocol.

14. The method of claim 10, wherein receiving the CSI message further comprises:
receiving the CSI message that includes the PMI field that includes the indication of the second transmission strategy utilizing layer two signaling or layer one signaling.

15. The method of claim 10, wherein the indication of the second transmission strategy includes a request for the network device to modify its transmission protocol for the downlink channel to the second transmission strategy.

16. An apparatus for wireless communication at a user equipment (UE), the apparatus comprising:
a processor;
memory coupled with the processor; and
instructions stored in the memory and executable by the processor to cause the apparatus to:
identify, by the UE, a transition from a first transmission strategy for a downlink channel to a second transmission strategy for the downlink channel based at least in part on a data transfer rate;
determine feedback information based at least in part on the second transmission strategy for the downlink channel; and
transmit, to a network device, a channel state information (CSI) message that includes the feedback information and a precoding matrix indicator (PMI) field, wherein the PMI field includes an indication of the second transmission strategy, and wherein the second transmission strategy is an open-loop multiple input multiple output (MIMO) transmission strategy.

17. The apparatus of claim 16, wherein:
the first transmission strategy is a closed-loop MIMO transmission strategy; or
the first transmission strategy is a semi-open-loop MIMO transmission strategy.

18. The apparatus of claim 16, wherein the first transmission strategy, or the second transmission strategy, or a combination thereof comprise a transmission mode.

19. The apparatus of claim 16, wherein the instructions to transmit the CSI message are further executable by the processor to cause the apparatus to:
transmit the CSI message that includes the PMI field that includes the indication of the second transmission strategy utilizing layer two signaling or layer one signaling, the indication identifying the second transmission strategy for the downlink channel.

20. The apparatus of claim 16, wherein the instructions are further executable by the processor to cause the apparatus to:
identify a preconfigured or predefined PMI entry based at least in part on identifying the transition to the second transmission strategy, wherein the indication of the second transmission strategy is the preconfigured or predefined PMI entry.

21. The apparatus of claim 16, wherein the instructions are further executable by the processor to cause the apparatus to:
determine a channel quality indicator (CQI) of the CSI message based at least in part on the indication of the second transmission strategy being in the PMI field of the CSI message, wherein the CSI message includes the determined CQI.

22. The apparatus of claim 16, wherein:
a first preconfigured entry of the PMI field indicates that the second transmission strategy is based at least in part on resource block group (RBG) based precoder-cycling or on precoding resource block group (PRG) based precoder-cycling; and
a second preconfigured entry of the PMI field indicates that the second transmission strategy is based at least in part on small delay cyclic delay diversity (CDD).

23. The apparatus of claim 16, wherein the data transfer rate is associated with the first transmission strategy for the downlink channel and the instructions to transmit the CSI message are further executable by the processor to cause the apparatus to:
transmit the CSI message that includes the PMI field that includes the indication of the second transmission strategy for the downlink channel based at least in part on the data transfer rate.

24. The apparatus of claim 16, wherein the indication of the second transmission strategy includes a request for the network device to modify its transmission protocol for the downlink channel to the second transmission strategy.

25. An apparatus for wireless communication at a network device, the apparatus comprising:
a processor;
memory coupled with the processor; and
instructions stored in the memory and executable by the processor to cause the apparatus to:
transmit first data utilizing a first transmission strategy on a downlink channel;
receive, from a user equipment (UE), a channel state information (CSI) message that includes feedback information and a precoding matrix indicator (PMI) field, wherein the PMI field includes an indication of a second transmission strategy for the downlink channel; and
transmit second data utilizing the second transmission strategy on the downlink channel based at least in part on a data transfer rate and receiving the CSI message, wherein the second transmission strategy is an open-loop multiple input multiple output (MIMO) transmission strategy.

26. The apparatus of claim 25, wherein:
the first transmission strategy is a closed-loop MIMO transmission strategy; or
the first transmission strategy is a semi-open-loop MIMO transmission strategy.

27. The apparatus of claim 25, wherein the instructions are further executable by the processor to cause the apparatus to:
modify a transmission protocol of the network device based at least in part on receiving the CSI message that includes the PMI field that includes the indication of the second transmission strategy, wherein transmitting the second data is based at least in part on the modified transmission protocol.

\* \* \* \* \*